(12) United States Patent
Bainbridge

(10) Patent No.: US 7,662,468 B2
(45) Date of Patent: Feb. 16, 2010

(54) COMPOSITE MATERIALS MADE FROM PRETREATED, ADHESIVE COATED BEADS

(75) Inventor: David W. Bainbridge, Golden, CO (US)

(73) Assignee: Brock USA, LLC, Boulder, CO (US)

( * ) Notice: Subject to any disclaimer, the term of this patent is extended or adjusted under 35 U.S.C. 154(b) by 2 days.

(21) Appl. No.: 10/685,965

(22) Filed: Oct. 15, 2003

(65) Prior Publication Data

US 2005/0025956 A1    Feb. 3, 2005

Related U.S. Application Data

(63) Continuation-in-part of application No. 09/684,470, filed on Oct. 6, 2000, now abandoned.

(51) Int. Cl.
  *B32B 3/26* (2006.01)
  *A41D 13/00* (2006.01)

(52) U.S. Cl. .............. 428/304.4; 428/317.1; 428/319.3; 428/319.7; 428/76; 428/313.3; 428/317.3; 2/455

(58) Field of Classification Search .............. 428/304.4, 428/316.6, 317.1, 313.3, 317.3, 319.3, 319.7, 428/76; 2/455
See application file for complete search history.

(56) References Cited

U.S. PATENT DOCUMENTS

| | | |
|---|---|---|
| 1,652,776 A | 12/1927 | Galanis |
| 2,179,631 A | 11/1939 | Holder |
| 2,298,218 A | 10/1942 | Madson |
| 2,404,758 A | 7/1946 | Teague et al. |
| 3,006,780 A | 10/1961 | Shaffer |
| 3,304,219 A | 2/1967 | Nickerson |
| 3,354,578 A | 11/1967 | Ryan |
| 3,459,179 A | 8/1969 | Olesen |
| 3,477,562 A | 11/1969 | Allen et al. |
| 3,489,154 A | 1/1970 | Kaspar et al. |
| 3,503,841 A | 3/1970 | Sterrett |
| 3,529,306 A | 9/1970 | Thorne |

(Continued)

FOREIGN PATENT DOCUMENTS

BE        871.755        5/1979

(Continued)

OTHER PUBLICATIONS

Kaplan et al, The article "Applications For Plasma Surface Treatment in the Medical Industry,"posted on Apr. 17, 2000.*

(Continued)

*Primary Examiner*—Hai Vo
(74) *Attorney, Agent, or Firm*—MacMillan, Sobanski & Todd, LLC

(57) ABSTRACT

A composite material comprised of polymeric beads and adhesive, primarily intended for use in constructing buildings, athletic fields, waste pond covers, packaging, contact sports gear and medial equipment, is comprised of a plurality of electrical excitation zone-treated beads having average diameters between about 1 mm and about 10 mm that are substantially coated with the adhesive material and used in quantities such that void spaces constitute at least about 10 percent by volume of the total volume of the composite material. Upon curing, said adhesive preferably has hardness levels ranging from about Shore A 20 to about Shore A 95.

30 Claims, 15 Drawing Sheets

U.S. PATENT DOCUMENTS

| | | |
|---|---|---|
| 3,552,044 A | 1/1971 | Wiele |
| 3,563,837 A | 2/1971 | Smith et al. |
| 3,606,726 A | 9/1971 | Spertus et al. |
| 3,608,961 A | 9/1971 | Heck |
| 3,616,162 A | 10/1971 | Noziere |
| 3,629,882 A | 12/1971 | Thorne |
| 3,640,787 A | 2/1972 | Heller |
| 3,661,687 A | 5/1972 | Spinney |
| 3,663,344 A | 5/1972 | Brock et al. |
| 3,663,469 A | 5/1972 | Weissmahr |
| 3,674,684 A | 7/1972 | Gollan |
| 3,676,288 A | 7/1972 | Hoyle |
| 3,710,510 A * | 1/1973 | Tully et al. ............... 47/58.1 R |
| 3,755,063 A | 8/1973 | Massev et al. |
| 3,762,404 A | 10/1973 | Sakita |
| 3,771,787 A | 11/1973 | Wood, Jr. |
| 3,816,234 A | 6/1974 | Winfield |
| 3,856,721 A | 12/1974 | Fritschel |
| 3,857,731 A | 12/1974 | Merrill, Jr. et al. |
| 3,864,181 A | 2/1975 | Wolinski et al. |
| 3,877,172 A * | 4/1975 | Schwab et al. ................. 47/64 |
| 3,877,960 A | 4/1975 | Knoss |
| 3,889,444 A | 6/1975 | Davis et al. |
| 3,968,530 A | 7/1976 | Dyson |
| 3,968,620 A | 7/1976 | Keltner |
| 3,978,263 A | 8/1976 | Wellensiek |
| 4,011,611 A | 3/1977 | Lederman |
| 4,034,506 A | 7/1977 | Kasahara |
| 4,054,204 A | 10/1977 | Keeton |
| 4,087,948 A | 5/1978 | Mellor |
| 4,102,109 A | 7/1978 | Modra et al. |
| 4,121,399 A | 10/1978 | Verville |
| 4,139,920 A | 2/1979 | Evans |
| 4,171,549 A | 10/1979 | Morrell et al. |
| 4,193,499 A | 3/1980 | Lookholder |
| 4,229,398 A | 10/1980 | Harvey |
| 4,239,519 A | 12/1980 | Beall et al. |
| 4,240,998 A | 12/1980 | Lichter et al. |
| 4,243,617 A | 1/1981 | Burge |
| 4,250,136 A | 2/1981 | Rex |
| 4,303,729 A | 12/1981 | Torobin |
| 4,343,047 A | 8/1982 | Lazowski et al. |
| 4,370,754 A | 2/1983 | Donzis |
| 4,391,561 A | 7/1983 | Smith et al. |
| 4,432,110 A | 2/1984 | Sutton |
| 4,441,905 A | 4/1984 | Malmendier et al. |
| 4,443,286 A | 4/1984 | Ikeda et al. |
| 4,472,472 A | 9/1984 | Schultz |
| 4,475,248 A | 10/1984 | L'Abbe et al. |
| 4,489,115 A | 12/1984 | Layman et al. |
| 4,493,877 A | 1/1985 | Burnett |
| 4,501,420 A | 2/1985 | Dury |
| 4,577,358 A | 3/1986 | Glass |
| 4,606,087 A | 8/1986 | Alivizatos |
| 4,607,403 A | 8/1986 | Alivizatos |
| 4,620,633 A | 11/1986 | Lookholder |
| 4,624,893 A | 11/1986 | Shibano et al. |
| 4,640,080 A | 2/1987 | Wright |
| 4,642,814 A | 2/1987 | Godfrey |
| 4,657,003 A | 4/1987 | Wirtz |
| 4,705,715 A | 11/1987 | DeCoste, Jr. et al. |
| 4,740,416 A | 4/1988 | DeCoste, Jr. et al. |
| 4,751,202 A | 6/1988 | Toussaint |
| 4,751,203 A | 6/1988 | Toussaint |
| 4,756,026 A | 7/1988 | Pierce |
| 4,777,763 A * | 10/1988 | Shannon et al. ................. 47/74 |
| 4,855,170 A | 8/1989 | Darvell et al. |
| 4,880,879 A * | 11/1989 | Bauman ..................... 525/130 |
| 4,905,320 A | 3/1990 | Squyers, Jr. |
| 4,989,794 A | 2/1991 | Askew et al. |
| 5,052,874 A | 10/1991 | Johanson |
| 5,055,340 A | 10/1991 | Matsumura et al. |
| 5,073,444 A | 12/1991 | Shanelee |
| 5,079,787 A | 1/1992 | Pollmann |
| 5,080,737 A | 1/1992 | Shoner |
| 5,085,424 A | 2/1992 | Wood, Jr. |
| 5,100,258 A | 3/1992 | VanWagoner |
| 5,102,260 A | 4/1992 | Horvath |
| 5,103,517 A | 4/1992 | Krouskop |
| 5,134,725 A | 8/1992 | Yeshurun et al. |
| 5,134,726 A | 8/1992 | Ross |
| 5,152,019 A | 10/1992 | Hirata |
| 5,176,924 A | 1/1993 | Williams |
| 5,201,780 A | 4/1993 | Dinsmoor, III et al. |
| 5,215,637 A | 6/1993 | Williams |
| 5,252,657 A * | 10/1993 | Frankel et al. ............... 524/460 |
| 5,279,237 A | 1/1994 | Alivizatos |
| 5,290,489 A | 3/1994 | Williams et al. |
| 5,292,840 A | 3/1994 | Heilmann et al. |
| 5,301,370 A | 4/1994 | Henson |
| 5,351,830 A | 10/1994 | Bender et al. |
| 5,352,318 A | 10/1994 | Takabayashi et al. |
| 5,356,344 A | 10/1994 | Lemieux |
| 5,357,015 A | 10/1994 | Haruvy et al. |
| 5,369,829 A | 12/1994 | Jay |
| 5,373,667 A | 12/1994 | Lemieux |
| 5,397,620 A | 3/1995 | Hord, III |
| 5,406,046 A | 4/1995 | Landes |
| 5,464,443 A | 11/1995 | Wilson et al. |
| 5,515,975 A | 5/1996 | Jarvis et al. |
| 5,537,688 A | 7/1996 | Reynolds et al. |
| 5,545,128 A | 8/1996 | Hayes et al. |
| 5,584,072 A | 12/1996 | Kim et al. |
| 5,587,231 A | 12/1996 | Mereer et al. |
| 5,614,310 A | 3/1997 | Delgado et al. |
| 5,622,030 A | 4/1997 | Steed et al. |
| 5,626,657 A | 5/1997 | Pearce |
| 5,669,079 A | 9/1997 | Morgan |
| 5,675,844 A | 10/1997 | Guyton et al. |
| 5,694,747 A | 12/1997 | Tesch |
| 5,699,561 A | 12/1997 | Broersma |
| 5,711,029 A | 1/1998 | Visco et al. |
| 5,711,215 A | 1/1998 | Sextl et al. |
| 5,712,015 A | 1/1998 | Guillem |
| 5,713,696 A | 2/1998 | Horvath |
| 5,720,714 A | 2/1998 | Penrose |
| 5,733,012 A | 3/1998 | Jones |
| 5,746,013 A | 5/1998 | Fay, Sr. |
| 5,778,470 A | 7/1998 | Haider |
| 5,826,273 A | 10/1998 | Eckes |
| 5,837,739 A | 11/1998 | Nowak |
| 5,849,864 A * | 12/1998 | Carlson et al. ................. 528/55 |
| 5,888,642 A | 3/1999 | Meteer et al. |
| 5,916,672 A | 6/1999 | Reeves |
| 5,920,915 A | 7/1999 | Bainbridge |
| 5,921,024 A * | 7/1999 | Minoji ...................... 47/62 R |
| 5,922,161 A | 7/1999 | Wu et al. |
| 6,027,806 A | 2/2000 | Abe et al. |
| 6,032,300 A | 3/2000 | Bainbridge |
| 6,055,676 A | 5/2000 | Bainbridge |
| 6,098,209 A | 8/2000 | Bainbridge |
| 6,301,722 B1 | 10/2001 | Nickerson |
| 6,357,054 B1 | 3/2002 | Bainbridge |
| 6,375,546 B1 | 4/2002 | Lemieux |
| 6,453,477 B1 | 9/2002 | Bainbridge |
| 6,464,770 B1* | 10/2002 | Palm et al. ................... 106/409 |
| 6,485,446 B1* | 11/2002 | Brother et al. ................. 602/20 |
| 6,525,125 B1* | 2/2003 | Giardello et al. ............ 524/439 |
| 6,528,947 B1 | 3/2003 | Chen et al. |
| 6,558,548 B2 | 5/2003 | Svirklys |
| 6,602,113 B2 | 8/2003 | Lemieux |
| 6,770,373 B1* | 8/2004 | Kinoshita et al. ........ 428/423.1 |
| 6,877,932 B2 | 4/2005 | Prevost |
| 2002/0018859 A1 | 2/2002 | Bednarz et al. |

| | | |
|---|---|---|
| 2004/0069924 A1 | 4/2004 | Lemieux et al. |
| 2005/0170179 A1 | 8/2005 | Audenaert et al. |

FOREIGN PATENT DOCUMENTS

| | | |
|---|---|---|
| CH | 577 328 | 7/1976 |
| FR | 2495-453 | 6/1982 |
| FR | 2616-655 | 12/1988 |
| GB | 1 378 494 | 12/1974 |
| JP | 07-137189 | 5/1995 |
| JP | 2000-034823 | 2/2000 |
| WO | WO 98/56993 | 12/1998 |
| WO | WO 99/26784 | 6/1999 |

OTHER PUBLICATIONS

English Abstract of JP 63-145362, Kawakami, Hiroshi, "Production of Hydrophilic Polyurethane Foam," Jun. 17, 1988, 1 page.*

A DVD disc entitled "Lectro Engineering Company, MTM Systems." About 3 to 3 1/2 minutes into a section of the disc designated as "Product Line" there is mention and depiction of electrical plasma treatment of shredded plastic bulk or powdered material.

Sales Literature of Faytex Corp., circa 1998.

Sales Literature of JSP International 1998.

Sales Brochure "Product Samples" of JSP International 1998.

Internet Ad of EcoByDesign 2003.

Internet Ad of Midwest Padding 2003.

Internet Ad of SilentWalk 2003.

Internet Ad of Tuplex Corp. 2003.

24 Page Brochure of Porex Technologies 1989-1992.

* cited by examiner

COMPOSITE MATERIALS MADE FROM PRETREATED, ADHESIVE COATED BEADS

RELATED APPLICATIONS

This patent application is a continuation-in-part of U.S. patent application Ser. No. 09/684,470 filed Oct. 6, 2000 now abandoned and which is incorporated herein in its entirety.

BACKGROUND OF THE INVENTION

1. Field of the Invention

The invention disclosed herein generally relates to the field of composite materials. For the purposes of this patent disclosure the term "composite material(s)" may be taken to mean a mixture (on a macro scale) of two or more materials that are solid in a finished state, are mutually insoluble, and differ in chemical nature. Certain preferred composite materials for the practice of the herein described invention are those polymeric beads associated with each other through use of adhesive materials. Such polymeric bead/adhesive composite materials are often referred to as "foam" or "foamed" materials. The most preferred composite materials for the practice are those polymeric bead/adhesive composite materials wherein the polymeric bead component is comprised of beads that have been treated in an electrically excited field.

The polymeric bead/adhesive composite materials of this patent disclosure have a wide variety of uses. For example they can be used as construction materials, insulation materials, sound and/or vibration abatement materials, drainage control materials, waste pond and/or landfill covers, packaging materials, padding for sports gear and/or medical equipment that comes into contact with the human body (e.g., helmets, shoulder pads, prosthetic devices, mattresses, cushions, etc.), indeed virtually any application where foam materials are employed. This invention also relates to treating those polymer beads used to make composite materials so that they will better form the end product materials of this patent disclosure. Generally speaking these treatment processes involve treating polymer beads in an electrically excited field.

2. Discussion of the Background

Designing composite materials for a wide variety of purposes (exterior wall and/or roof insulation, building foundation drainage control systems, athletic field padding, e.g., to be placed under athletic field turf, sound and/or vibration absorbing materials, waste pond covers, protective padding sports equipment, prosthetic devices, mattresses, etc. presents numerous challenges. For example, composite materials used as insulation in wall or roof construction is most preferably air breathable in nature. Composite materials used in building foundation drainage systems must be water permeable (preferably in all three directions). Designing protective padding for impact absorbing athletic gear is especially challenging. In addition to having the padding perform its primary function of repeatedly absorbing high impact forces, such padding also should be lightweight, air breathable, water permeable and washable. It also should be easily integrated into sports gear such as jerseys, pants, helmets, shoulder pads and the like—in a manner that does not unduly inhibit the user's movements.

Thus, using athletic equipment design as an example of such design challenges, one would note that many prior art pads and padding techniques accomplish some of these goals—to varying degrees. For example, U.S. Pat. No. 4,343,047 to Lazowski teaches use of loosely filled, lightweight beads in a breathable casing to form a helmet pad. The helmet pad readily conforms to the contours of the wearer's head. In use, the loose beads are designed to move or shift around relative to each other within the casing. The beads also are designed to be crushable in order to absorb and attenuate particularly high impact forces. Crushable beads of this kind are designed to absorb one major impact, much like a car airbag. Therefore, padding made from crushable beads cannot be used in most athletic gear (e.g., football thigh and knee pads) since it must be able to withstand repeated impacts without losing its mechanical integrity.

Other prior art, sports-related, padding materials use incompressible beads that are designed not to be crushed (e.g., British Patent No. 1,378,494 to Bolton, U.S. Pat. No. 3,459,179 to Olesen, and U.S. Pat. No. 4,139,920 to Evans). Still others use beads that are resilient rather than crushable (e.g., U.S. Pat. No. 3,552,044 to Wiele and U.S. Pat. No. 5,079,787 to Pollman). These beads also are loosely packed in a bead containment sack or casing. Here again, this allows the beads to move, roll, flow, etc. relative to each other in order to achieve maximum pad conformation to the shape of a particular part of the human body. The Wiele patent further teaches lubrication of such beads to enhance their flowability to achieve such conformation. In this art, these loosely packed conditions are often referred to as "underfilling". The general object of underfilling is to achieve a padding material having the flow and conforming characteristics of a liquid-filled pad, without the burden of carrying the relatively heavy weight of liquids—or the need for waterproofing the casings needed to contain them.

While underfilled pads initially behave like a liquid when subjected to impacts, they have a tendency toward allowing the beads contained therein to be permanently driven out of the way in localized areas that receive repeated blows. This tendency gradually reduces the thickness of the padding around the human body part receiving the repeated blows. Indeed, this tendency may even allow the human body part to eventually "bottom out" in the pad. Under such bottomed out conditions, the beads are driven away from the very areas where they are most needed.

Consequently, much of the padding used in today's athletic equipment is comprised of one or more sheets or layers of foam-like materials rather than underfilled pads. So used, these foam-like materials have the distinct advantage of not easily bottoming out. They also are relatively light in weight and inexpensive to manufacture. There are two general types of foam padding materials. The first type comprises so-called "closed cell" foams. Aside from not being inclined to bottom out, such foams also have the advantage of not absorbing moisture such as perspiration. However, closed-cell foams tend to be stiff—and, hence, body movement-stifling. Moreover, closed cell foam materials do not readily conform to human body contours, particularly under the rapidly changing conditions associated with many contact sports. Moreover, closed-cell foams do not "breathe" very well and therefore do not allow dissipation of the equipment user's body heat. Closed cell foams also suffer from the fact that they are not readily sewn into, or washable with, athletic clothing and equipment such as jerseys, pants and the like.

The second type of foam commonly used in sports and medical equipment comprises so-called "opened-cell" foams. These foams tend to be softer and more pliable than closed-cell foams. Hence, they tend to better conform to various contours of the human body, especially under rapidly changing conditions. They also do not inhibit the user's movements nearly as much as closed-cell foams. Open-cell foams also have good breathing qualities. Opened-cell foams do, however, tend to absorb and hold moisture and odor to such a degree that this tendency is often regarded as their major drawback. Hence, open-cell foams are usually coated with a waterproofing material (e.g., vinyl and the like) to prevent high levels of absorption of perspiration. Unfortunately, use of these coating materials tends to make athletic pads made from opened-cell foams considerably less breathable and, hence, more body heat-retaining. Use of these coating materials also tends to make the underlying pads less pliable.

Padding materials made from polystyrene, polyethylene and polypropylene have proven to be especially efficacious in athletic equipment (e.g., football helmets, shoulder pads, etc.) that must repeatedly absorb impacts. The precursor beads (polystyrene, polyethylene, polypropylene and mixtures thereof) from which these materials are made are simply placed in a container and subjected to heat treatments (e.g., steaming) in order to join the individual beads to each other and thereby create unified materials from which padding for sports equipment can be made. These manufacturing processes are very generally depicted in FIGS. 2-7 of this patent disclosure. For example, the cross-sectional bead array shown in FIG. 2 can be heated (e.g., by steam) in order to join or meld the individual beads 1, 2, 3, 4, 5, 6, etc. into a unified body of material such as that depicted in FIG. 3. In FIG. 2, the individual beads are shown having idealized, round configurations. This implies that void spaces will exist between abutting individual beads. Those skilled in this art will appreciate that these void spaces become filled in when the beads are made fluid or plastic in nature by the heat treatment used to join or meld the beads together in the manner suggested in FIG. 3. After such heat treatments, the composite body constitutes a "foam" from which padding materials can be made. A perspective view of a generalized block of such foam material is depicted in FIG. 4. It illustrates that the void spaces shown in FIG. 2 become filled in (in all three dimensions) by the material from which the individual beads are made; hence the resulting foam material does not possess particularly good breathing qualities.

Other composite materials, that are primarily used in applications other than athletic equipment (e.g., building materials such as those used in insulation slabs, sound/vibration absorbing slabs, athletic turf padding/drainage control slabs, building foundation drainage control slabs, waste pond covers, etc.), have been designed to maintain void spaces between their individual beads even after they have been subjected to such heat treatments. The void spaces contribute to the relatively light weight of such building materials. Such materials are usually made from hollow microspheres or microbeads that are—to some degree—covered with a resin material that is applied to the microspheres by melting the resin material in the presence of the beads. For example, U.S. Pat. No. 5,587,231 ("the '231 patent") teaches a foam material made from a mixture of hollow ceramic microspheres and dry granules of a resin powder. The dry resin powder is a thermosetting or high-temperature thermoplastic whose individual particles are mechanically mixed into a mass of dry microspheres. Upon heating the hollow microsphere/resin mixture to the resin powder's melting point, the microspheres become bonded together by a cured form of the resin that results from the heat treatment and subsequent cooling of the melted resin material. That is to say that the resin is in a melted state when it first goes into a liquid state (by virtue of having been melted) and makes its initial contact with the beads in this liquid (and melted) state. The end product material is an array of (1) hollow ceramic microspheres, (2) a thermally set resin that interconnects individual microspheres and thereby serves to hold said microspheres in a cohesive body and (3) void spaces. Optionally, the material may contain fiber strands as well. These materials are depicted in FIGS. 2A and 2B of the '231 patent as well as in FIG. 12 of the present patent disclosure.

Because the dry resin powder taught in the '231 patent disclosure is simply mechanically mixed with the microspheres, the resulting materials are, to some degree, characterized by the fact that the cured resin does not tend to fully coat the microspheres (again see FIGS. 2A and 2B of the '231 patent or FIG. 12 of the present patent disclosure). That is to say that the '231 patent's thermally set resin material associates with the beads in such a manner that it generally serves to form branch-like, or net-like, components whose individual elements serve to interconnect the beads at certain limited locations on the bead's surface—as opposed to fully coating the microspheres. The '231 patent's end product materials also are characterized by the fact that the void spaces created by the thermal setting of the resin tend to be "clogged" and somewhat randomly created in said materials. Hence, the breathing qualities of these materials are not particularly good. This is, however, of little or no concern to the '231 patent disclosure because its light weight materials are intended for use as construction materials in buildings, aircraft, trucks, boats, tanks and the like. These breathing qualities will be contrasted with the padding materials of applicant's patent disclosure wherein the resulting bead/adhesive/void space materials remain highly breathable and hence better suited for use in athletic equipment or medical equipment.

U.S. Pat. No. 5,888,642 ("the '642 patent") teaches a padding material similar to that taught in the '231 patent. It is comprised of microspheres that are held together in a coherent body by two resins. One of these resins is melted and subsequently thermally set. The teachings of this patent disclosure differ from those of the '231 patent in that the second resin in the '642 patent forms microballoons when suitably heated. In any case, the resulting material also has an array of hollow beads, resins and void spaces. It does not, however, necessarily have fiber strands as part of its make as in the case in the '231 patent. A representative material is shown in FIG. 9 of the '642 patent and in FIG. 11a of the present patent disclosure. As was the case in the '231 patent, the materials taught by the '642 patent are intended for use as construction materials rather than as padding for athletic equipment or medical equipment.

U.S. Pat. No. 3,640,787 to Heller teaches a method of making construction materials from fully coating shaped beads of low specific gravity (e.g., polystyrene) with a liquid binder material. In effect, the beads are first immersed in a liquid form of the binder. This immersion fully coats the beads. The resulting binder-covered beads are, in turn, coated with a solid pulverulent material such as particles of metal oxides, sand and the like. FIG. 4 of the Heller patent disc004sure shows that cell-like bodies are formed from the beads (e.g., polystyrene beads) and that the walls of these cells are comprised of the hardened binder material which also contains the pulverulent materials embedded therein. Since the resulting honeycomb-like materials have no void spaces between its adjoining cells, the resulting material does not have good breathing qualities. In other words, Heller's individual cells do have void spaces, but they are totally surrounded by the cell walls created from the beads and binder/pulverant coating on those cell walls. Here again, however, this is of little concern to the Heller patent disclosure since its end product materials also appear to be intended for use as building construction materials rather than padding for athletic equipment.

Thus, there remains a continuing need for composite materials that are particularly characterized by the fact that they are highly breathable, water permeable (especially in all three directions) light in weight, conformable to the human body, and able to withstand repeated blows without mechanically breaking down and/or bottoming out. To this end, the composite materials disclosed herein have high levels of all of these desired qualities. Moreover, they can be easily incorporated into a wide variety of applications. They also are (if need be) washable and relatively easy, and inexpensive, to make.

It might also be noted that, even though their ability to repeatedly absorb blows may not be needed, the other attributes of these padding materials (breathability, light weight, conformability to the human body) also make them well suited for use in medically related devices such as prosthetic devices, cushions, mattresses and the like. Moreover, the breathing qualities of these materials may, alone, make them suitable for use as padding for certain goods that must be exposed to air during shipping. The breathability of these composite materials also makes them useful as filters. For example they would be particularly useful in equipment where both padding and filtering functions must be performed by the same material. By way of example only, applicant's materials can be used as padding in electrical equipment such as computer hard drive equipment that must be protected from mechanical disturbances and subjected to a stream of cooling air that must be filtered before introduced into hard drives that have very little tolerance for particles of foreign materials. There are of course many applications where "breathability" may not be a particularly important attribute—but does no harm in that application (building insulation, soundproofing, drainage control packaging, etc.).

SUMMARY OF THE INVENTION

This invention relates to processes and apparatus for making composite materials. Such composite materials are primarily comprised of polymer beads and adhesive materials. Additives such as flame retardant agents and the like may also be present. In any case, applicant's processes begin with corona, plasma, hybrid corona/plasma and/or glow discharge treatments of the polymer beads that will be combined with an adhesive material to make the subject composite materials. Thus, for the purposes of this patent disclosure these beads can be referred to as "electrical excitation zone-treated" particles, beads, etc. The polymer beads treated by the apparatus and processes of this patent disclosure will generally range in average diameter from about 1 millimeter (mm) to about 10 mm. Treatment of those beads ranging in average diameter from about 1 to about 4 mm is even more preferred. The treatments of this patent disclosure may be directed at an entire bead body (e.g., causation of a chemical reaction of substantially all of the material from which a given bead is made). However, in some of the most preferred embodiments of this invention, the herein described electrical excitation zone treatment processes will primarily be used to effect treatments of the surface areas of the subject polymer beads.

Such surface treatments can, for example, be used to cause chemical reactions of the surface molecules of a given polymer bead in order to create certain desired chemical groups. That is to say that, in effect, the electrical excitation zone treatments of this patent disclosure can cause electrons and/or ions having different energies to hit a given polymer bead's surface and thereby causing molecular chains comprising the bead's surface to be broken in a manner such that new functional chemical groups are formed. By way of example only, such chemical groups can be those having oxygen based radicals, e.g., carboxyl groups, hydroxyl groups, peroxide groups and the like. The creation of such functional groups is especially efficacious in bonding the treated beads with various adhesives used to bind an array of such beads together in order to produce larger formed materials such as foams. Other embodiments of this invention may be used to remove contaminating materials (e.g., water, oil, foreign chemical films, foreign particles and the like) from the surface regions of such beads. Such decontamination treatments are particularly effective when the contaminating substance is volatile in nature (e.g., water, oil and/or chemicals in liquid forms). These surface treatments also may be used to etch or otherwise physically change the topographies of certain polymer beads. Generally speaking, new surface topographies are created on treated beads when ions generated in the electrical fields created by the apparatus of this patent disclosure hit the surfaces of said beads with a distribution of different energies.

Regardless of the molecular structure of the polymers from which the subject particles are made, or the purpose of their treatments (e.g., causation of chemical reactions, particle surface cleaning, etching, deposition of particle surface coatings and the like), the basic treatments of this patent disclosure will include the steps of: (1) introducing polymeric beads into an electrical excitation chamber (e.g., a corona, plasma, hybrid corona/plasma and/or glow discharge etc. chamber), (2) introducing at least one gas into the electrical excitation chamber to create a bead/gas mixture, (3) directing the bead/gas mixture through at least one electrical excitation zone created in the excitation chamber, (4) creating an electrically excited gas that treats the beads and (5) removing a resulting treated bead/gas mixture from said chamber. Some preferred embodiments of this invention may involve treating beads with a first electrically excited gas to achieve a first purpose (e.g., cleaning), removing that gas from the excitation chamber and treating the beads with a second electrically excited gas to achieve a second purpose (e.g., deposition).

Next, it should be noted that in those cases involving creating chemical functional groups, the cleaning particle surface and/or etching gas may be an inert gas such as nitrogen and/or argon. In the case of deposition coating such beads, however, the gas will not be inert, but rather be a gas that is (1) capable of being ionized under the electrical field conditions employed by the herein described processes and (2) capable of being deposited on the surface of the subject beads. The use of one or more of gases having these characteristics with one or more inert gases is also possible in the practice of this invention. It should also be noted that an electrical excitation chamber used to carry out the processes of this patent disclosure may be, but need not be, under vacuum conditions according to certain considerations hereinafter more fully described.

Some particularly preferred embodiments of this invention will further comprise the use of more than one electrical excitation electrode to produce more than one electrical excitation zone in the electrical excitation chamber. Still other particularly preferred embodiments of this invention will employ multiple electrical excitation zones whose fields overlap. These multiple electrical excitation zones will preferably be created through use of at least one electrical excitation electrode located within the electrical excitation chamber and at least one electrically opposed electrode (e.g., a ground electrode) that is separated from the excitation electrode by a dielectric material at a distance that permits flow of a bead/gas mixture between said excitation electrode and said dielectric material. The electrically opposed electrode can be positioned inside of the electrical excitation chamber (e.g., in the manner generally depicted in FIG. 4 of U.S. Pat. No.

5,357,015). However, in some of the most preferred embodiments of this invention, the opposing electrode (preferably a grounding electrode, rather than an excitation electrode) will be located outside of the body of the electrical excitation chamber. Other particularly preferred embodiments of this invention will employ bead flow directing devices and/or gas stream directing devices to direct a bead/gas mixture through the electrical excitation zone(s). Other particularly preferred embodiments of this invention will employ hybrid corona/plasma field creating apparatus hereinafter more fully described to created electrical excitation zones. Their hybrid corona/plasma treatments are especially useful in effecting surface treatments of certain polymeric beads. Still other preferred embodiments of this invention will employ treatment apparatus that have a series of interconnected treatment vessels (e.g., three such interconnected vessels) that are particularly well suited to carrying out "continuous" or semi-continuous operations (as opposed to "batch" operations). Still other embodiments will employ excitation chambers as connecting devices between vessels (e.g., in an apparatus comprised of a series of vessels that carry out continuous or semi-continuous embodiments of the herein described particle treatment particles).

Be these processes and/or apparatus features as they may, applicant's composite materials are comprised of three dimensional arrays of beads that are treated by the above described processes before they are bound together in a coherent body (e.g., a slab) by an adhesive that substantially covers or coats a major portion (i.e., at least 50%, preferably at least 80% and most preferably, substantially 100%) of all of the beads in said coherent body. In order to best do this, the adhesive will constitute from about 20 to about 150 weight percent of the composite material. Moreover, upon curing, the adhesive should have a hardness level ranging from about Shore A 20 to about Shore A 95. The resulting composite materials also should have void volumes that constitute from about 10 to about 40 volume percent of that material. The adhesive coated beads used to make these composite materials will generally have overall diameters (i.e., bead diameter plus coating thickness) ranging from about 1 to about 10 millimeters ("mm"). In some of the more preferred embodiments of this invention, however, these coated beads will have average diameters ranging from about 1 to about 4 mm.

More specifically, applicant has found that the breathability, water porosity, impact resistance, washability and ease of manufacture of the composite materials of this patent disclosure are achieved when the beads from which the composite materials are made are pretreated in a manner hereinafter more fully described—before they are coated with adhesives. These bead pretreatments will include the steps of: (1) introducing the subject beads into an electrical excitation chamber (e.g., a corona, plasma, hybrid corona/plasma and/or glow discharge etc. chamber), (2) introducing at least one gas into the electrical excitation chamber to create a bead/gas mixture, (3) directing the bead/gas mixture through at least one electrical excitation zone created in the excitation chamber, (4) creating an electrically excited gas that treats the beads and (5) removing the resulting treated bead/gas mixture from said chamber.

Applicant's substantial adhesive coating of these electrical excitation zone-treated beads can be improved upon by virtue of the fact that the adhesive is associated with the beads while said adhesive is in a liquid (or semi-liquid) state. More preferably, this liquid state is not brought about by melting said adhesive material(s). In other words, applicant's adhesive is most preferably not in a melted state when it is, as a liquid or semi-liquid, initially placed in contact with the beads. The adhesive is then cured or hardened from its initial liquid state (wherein the adhesive is not in a melted state) while in contact with said beads. Thus, for the purposes of this patent disclosure, expressions such as "adhesive cured from a liquid state (or semi-liquid state) wherein the adhesive is not melted while in contact with individual beads" means that applicant's adhesive compositions are not made to be liquids (or semi-liquids) by melting their adhesive components. This circumstance is to be contrasted with the teachings of the '231 and '642 patents wherein beads are associated with dry resin particles which are first melted (and thereby become liquids or semi-liquids) and thereafter allowed to set in order to create the thereindisclosed bead/resin/void space systems.

Next, applicant notes that, for the purposes of the present patent disclosure, the expression "substantially coats" should be taken to mean that an adhesive material covers at least 50 percent of a pretreated bead's surface area. Preferably, the majority of the pretreated beads in applicant's resulting padding materials will be at least 60% covered by an adhesive layer. More preferably, at least 80% of the pretreated beads in a given body of the composite materials of this patent disclosure will be at least 80% covered by such an adhesive material. Most preferably, substantially 100% of such beads will be substantially 100% covered with the liquid adhesive. To these ends, the liquid adhesive compositions of this patent disclosure will have viscosities ranging from about 500 centipoises ("cps") to about 5000 cps under ambient conditions. Generally speaking, the liquid adhesive composition will be capable of wetting the pretreated beads upon contact.

As was previously noted, the cured form of the adhesives employed in applicant's padding materials will have Shore hardness levels ranging from about Shore A 20 to about Shore A 95. In some of the most preferred embodiments of this invention, the Shore hardness levels of the cured adhesive coatings will range from about Shore A 60 to about Shore A 90. It also should be noted that, even after their volatile components have left the adhesive material as part of the curing process, the adhesive component of the end product material will represent a major part (20-80%) of the weight of the padding material even though it may represent a relatively minor part of the material's volume. Indeed, for reasons hereinafter more fully discussed, these adhesive materials will usually represent no more than about 5 volume percent of applicant's finished product composite materials.

The composite materials made according to the teachings of this patent disclosure also are particularly characterized by their possession of relatively large void volumes that are comprised of a large number of smaller void volumes that are, to a substantial degree, regularly spaced from each other. Moreover, these smaller void volumes are, to a large degree, in fluid communication with each other. This is to be contrasted with the totally encapsulated void volumes, if any, of the cells of the '787 patent disclosure (see FIG. 4 thereof). The presence of an array of regularly spaced and greatly interconnected void volumes gives applicant's composite materials a particularly porous (e.g., water permeable), breathable (e.g., air breathable) quality that greatly enhances their viability as athletic or medical equipment components. That is to say that the particularly good porosity and breathing qualities resulting from this array of regularly spaced void spaces that are in fluid communication with each other, produces improved perspiration evaporation and, hence, improved body heat dissipation, qualities in applicant's composite materials that are used in association with the human body, e.g., padding materials in athletic equipment, prosthetic devices, mattresses and the like.

For purposes of this patent disclosure the expression "regularly spaced" should be taken to mean that (on average), at least one void space will preferably be present between at least every third bead (in all three dimensions). In some of the more preferred embodiments of this invention, this regularity will imply that such void spaces ideally will be present (on average) between every second bead. In some of the most preferred forms of applicant's composite materials, a void space will (on average) exist between substantially every bead in a body of said materials. The breathing qualities of applicant's composite materials generally tend to improve as this ideal is approached. Preferably, these void spaces will constitute at least about 10 percent, but no more than about 40 percent, of the total volume of the resulting composite material.

Applicant has found that the presence of these regularly spaced void spaces are preferably brought about when the adhesive is applied in a liquid (or semi-liquid) state to the surface of the beads in quantities such that a subsequent dry form of the adhesive (resulting from its curing and/or drying) constitutes from about 20 weight percent to about 80 weight percent of applicant's end product, bead/adhesive/void space-comprised composite materials. In some of the most preferred embodiments of this invention the dried or cured form of the relatively hard adhesive will represent from about 40 to about 60 weight percent of applicant's end product composite materials.

In the case of use of applicant's composite materials being used as padding materials used in sporting or medical equipment, said materials will be placed in a pliable casing material such as a cloth-like, or web-like bag, casing or cover. When used in contact sports equipment, these padding materials (and their coverings) can be further associated with shell-like, outer facing, inelastic materials such as those hard plastic materials from which the outer surfaces of football helmets, football shoulder pads, thigh pads and the like are made. Some representative uses of applicant's padding materials in such equipment will be more fully illustrated in subsequent portions of this patent disclosure. Again, the porous, breathable, padding materials of this patent disclosure make them particularly well suited for use in athletic or medical equipment. They can, however, also be used when lightweight, shock absorption, or breathability are not strongly called for; e.g., in other applications such as construction materials such as those slabs of composite materials placed (1) around building foundations, (2) under artificial athletic playing fields, (3) under floors, (4) between walls and so forth. These padding materials also can be used as shipment padding and packaging materials for shipping other objects (such as mechanical or electrical equipment, fruit, eggs or vegetables), air filters, waste pond covers, light weight sound and/or vibration abatement materials and the like.

BRIEF DESCRIPTION OF THE DRAWINGS

FIG. 5 however shows some of the beads (i.e., beads 2, 3, 4, 5, 6 and 7) as being made of a material different from the remainder of the beads.

Said ellipsoidal bead is shown about 80% covered with a layer of adhesive 26 of varying thickness 27".

Figure 16:
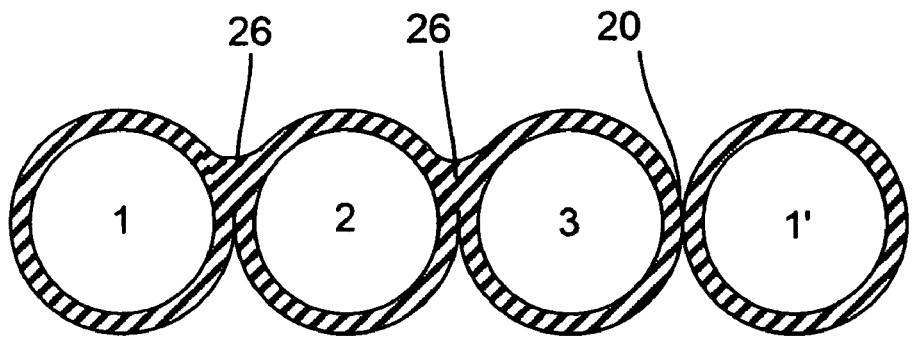

FIG. 16 shows a portion of an idealized, two dimensional, bead system wherein the beads are solid and wherein every third bead in this two dimensional presentation is regularly provided with an adjacent void space 20.

Figure 17:
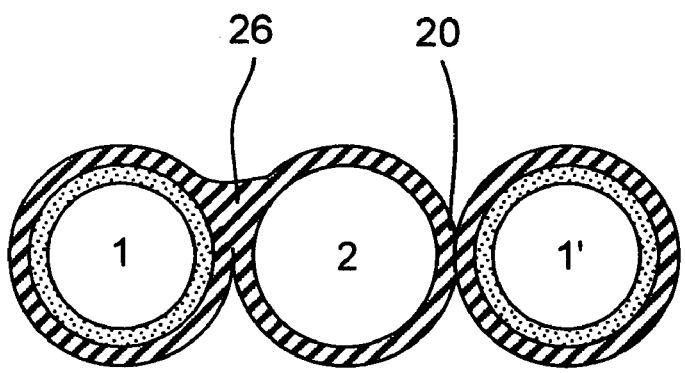

FIG. 17 shows a portion of an idealized bead system wherein every second bead is regularly provided with an adjacent void space 20.

Figure 18:
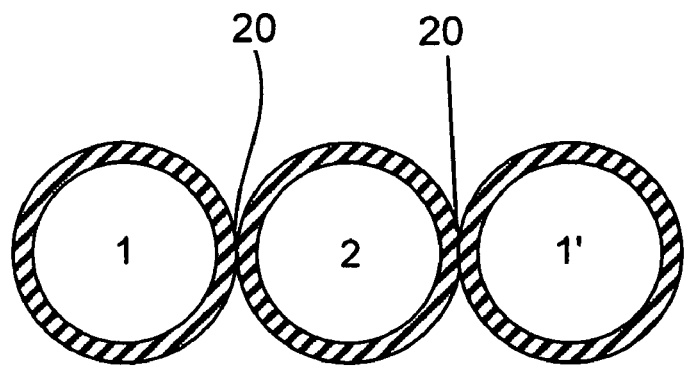

FIG. 18 shows a portion of an idealized bead system wherein every bead is regularly provided with an adjacent void space 20.

Figure 19:
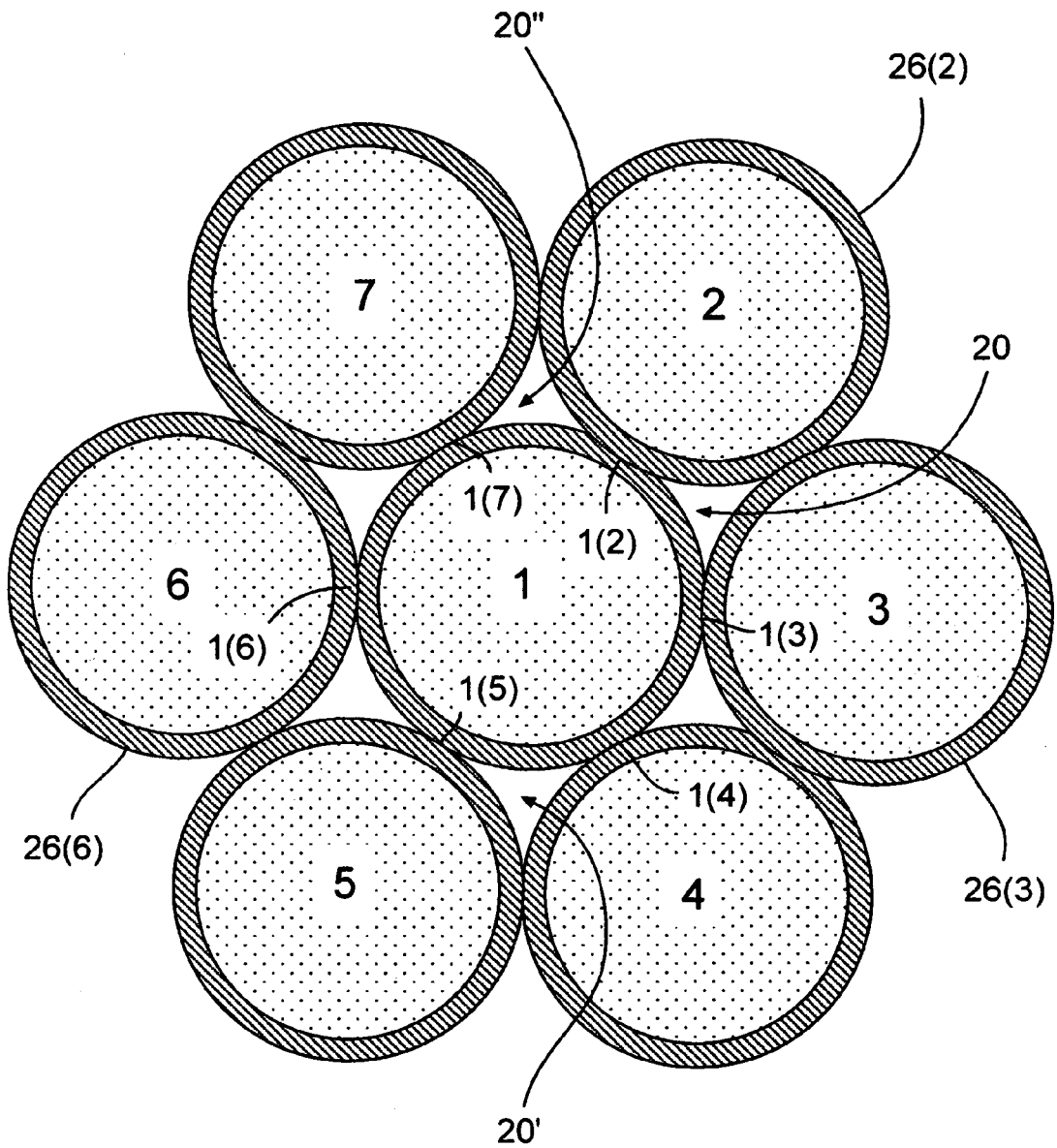

FIG. 19 depicts another two dimensional system of adhesive-coated beads associated in a manner taught by this patent disclosure. Said system is comprised of essentially round, solid beads (such as that shown in FIG. 13) that are completely coated with a layer of adhesive material of substantially uniform thickness.

Figure 19A:
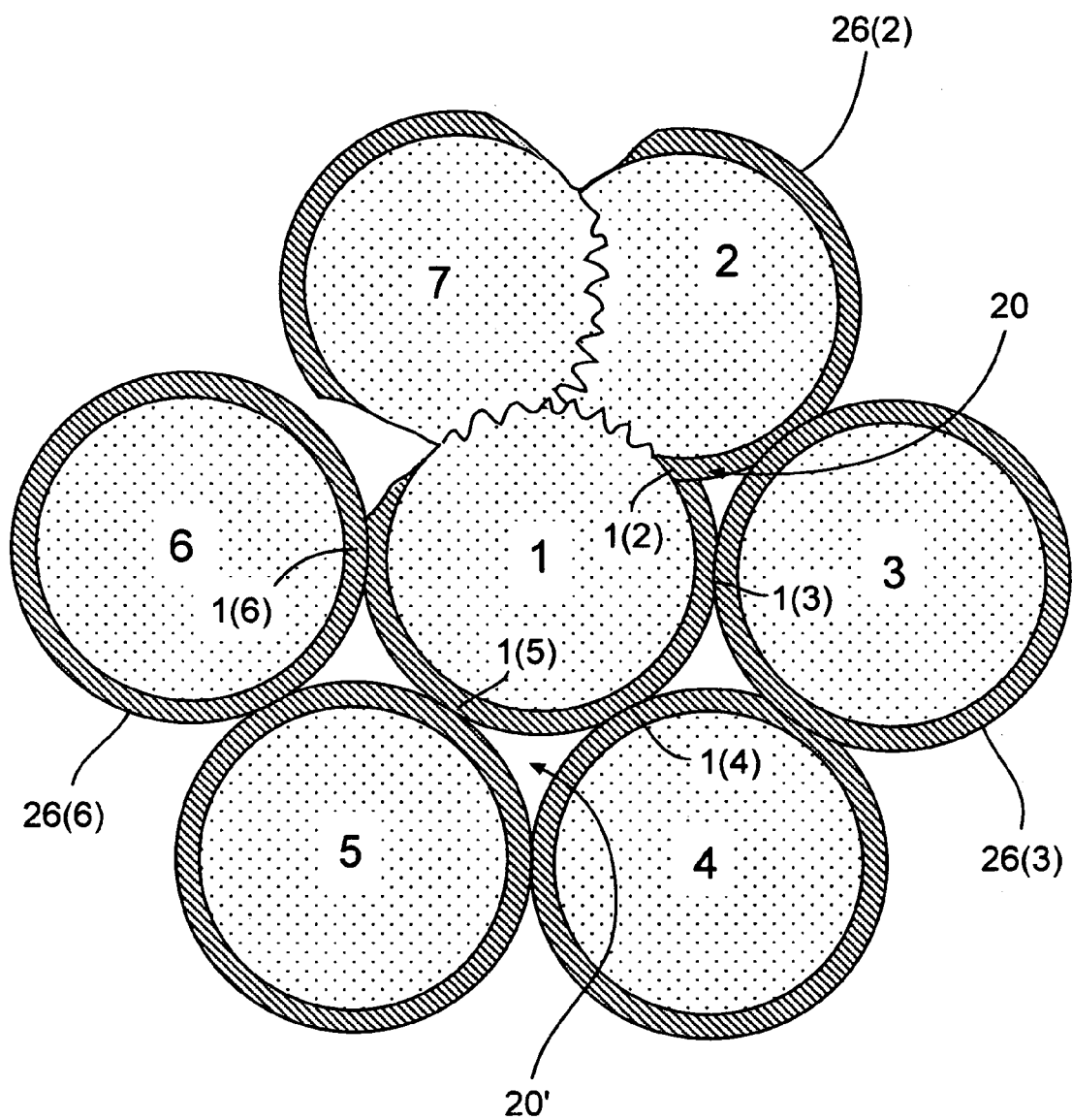

FIG. 19A depicts an array of beads wherein some of the beads are not totally covered by the adhesive and wherein some of the bead bodies have, to some degree, melted together.

Figure 20:
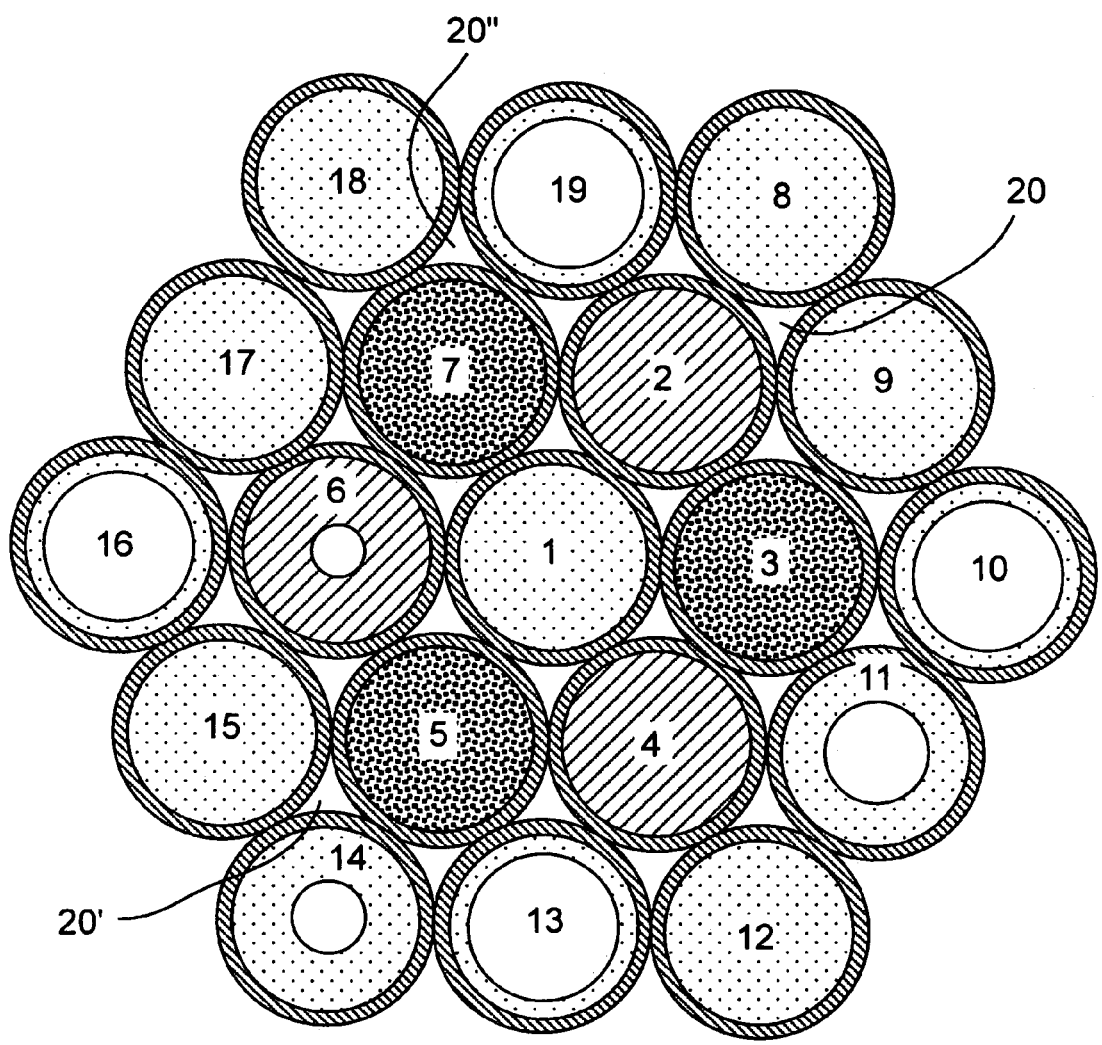

FIG. 20 depicts an bead/adhesive/void composite material system of this patent disclosure that is comprised of uniformly coated beads made from three different bead construction materials and wherein some of the beads have holes passing through the body of the bead.

Figure 21:
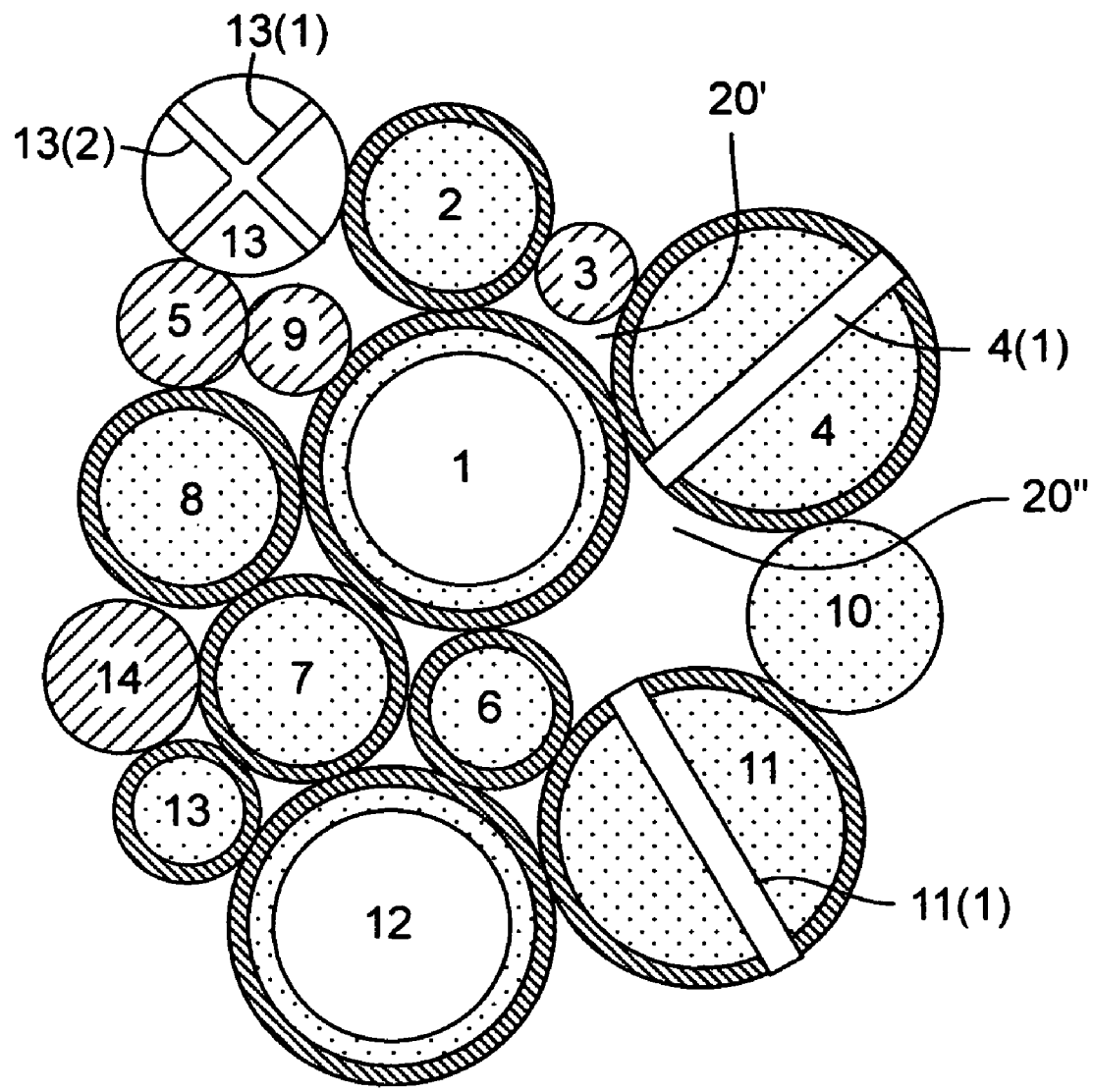

FIG. 21 depicts an bead/adhesive/void space composite material of this patent disclosure that features the use of beads of different sizes and different construction materials as well as the use of non-coated beads in such composite materials.

Figure 22:
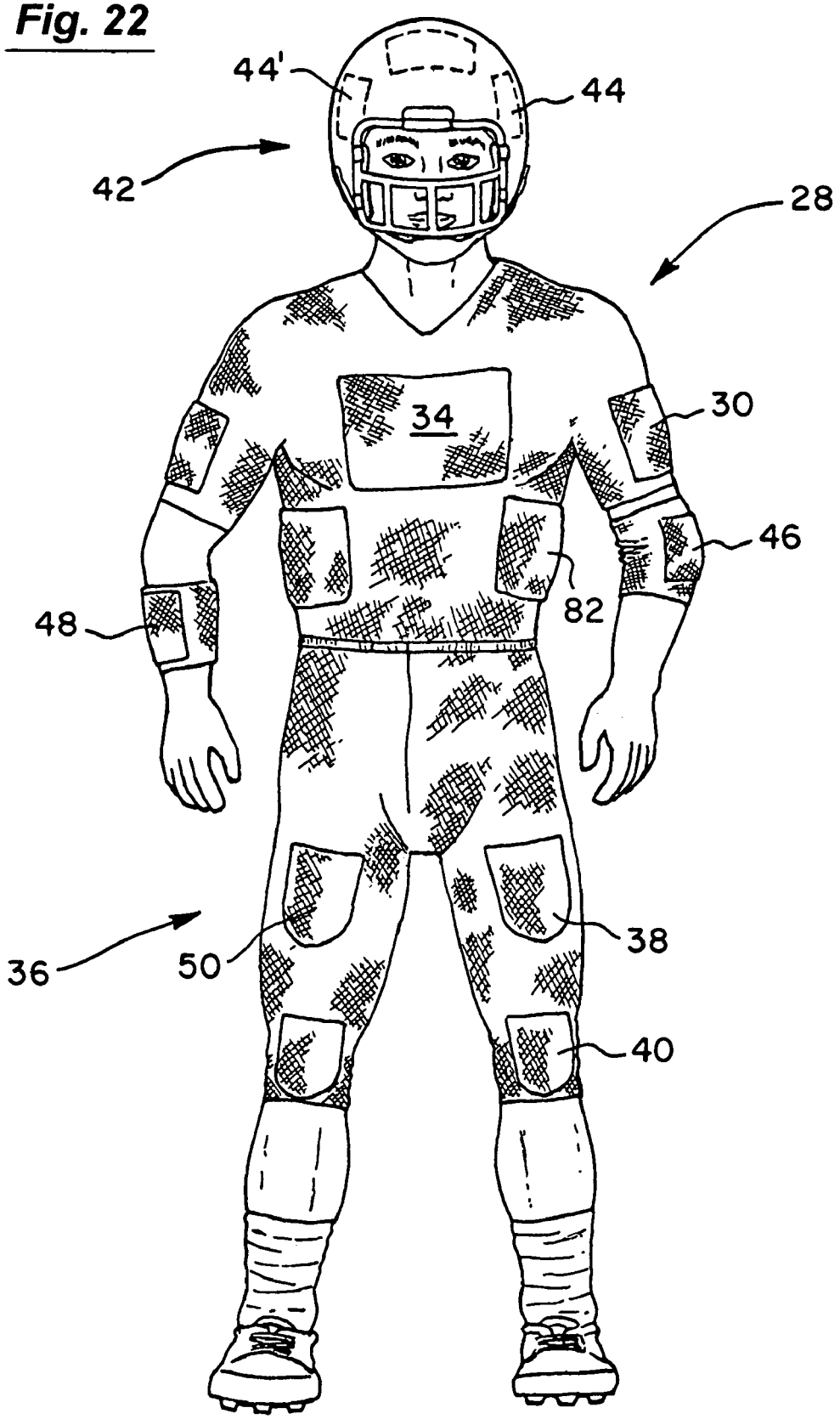

FIG. 22 illustrates the composite materials of the present invention integrated into various items of football equipment.

Figure 23:
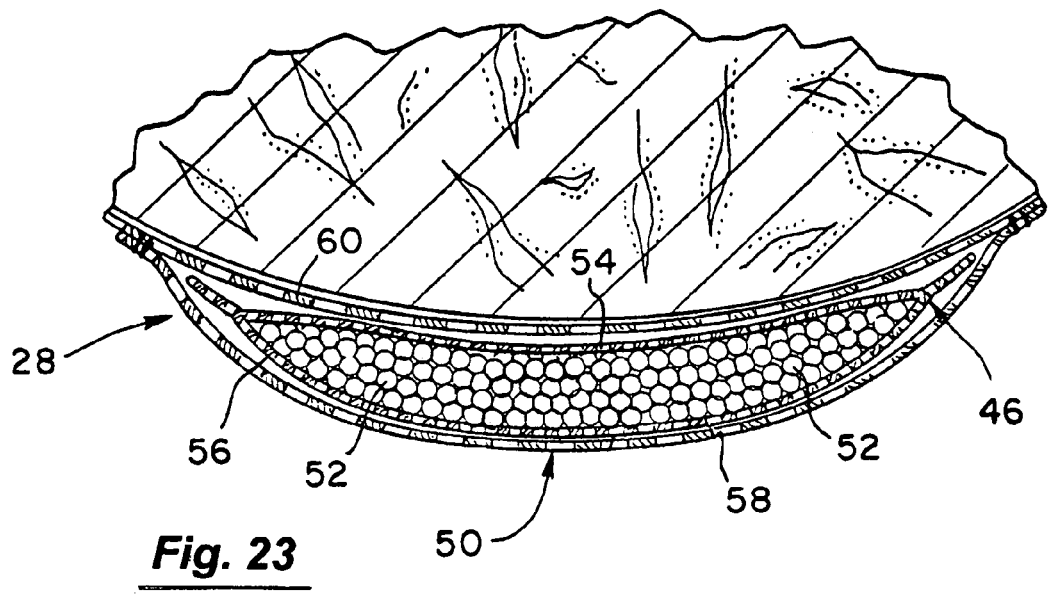

FIG. 23 is a cross-sectional view of a pad made according to the teachings of this patent disclosure. Such pads can be used in various items of equipment for contact sports such as football, hockey, lacrosse and the like.

Figure 24:
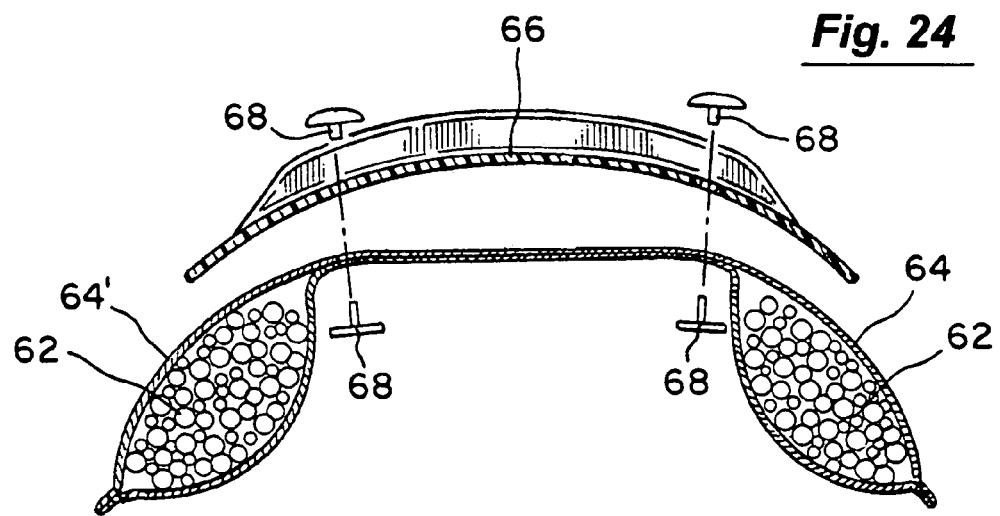

FIG. 24 is an exploded view of a football thigh pad that employs the padding materials of this patent disclosure in conjunction with an outer facing shell made of a hard plastic material.

DETAILED DESCRIPTION OF PREFERRED EMBODIMENTS

Figure 1:
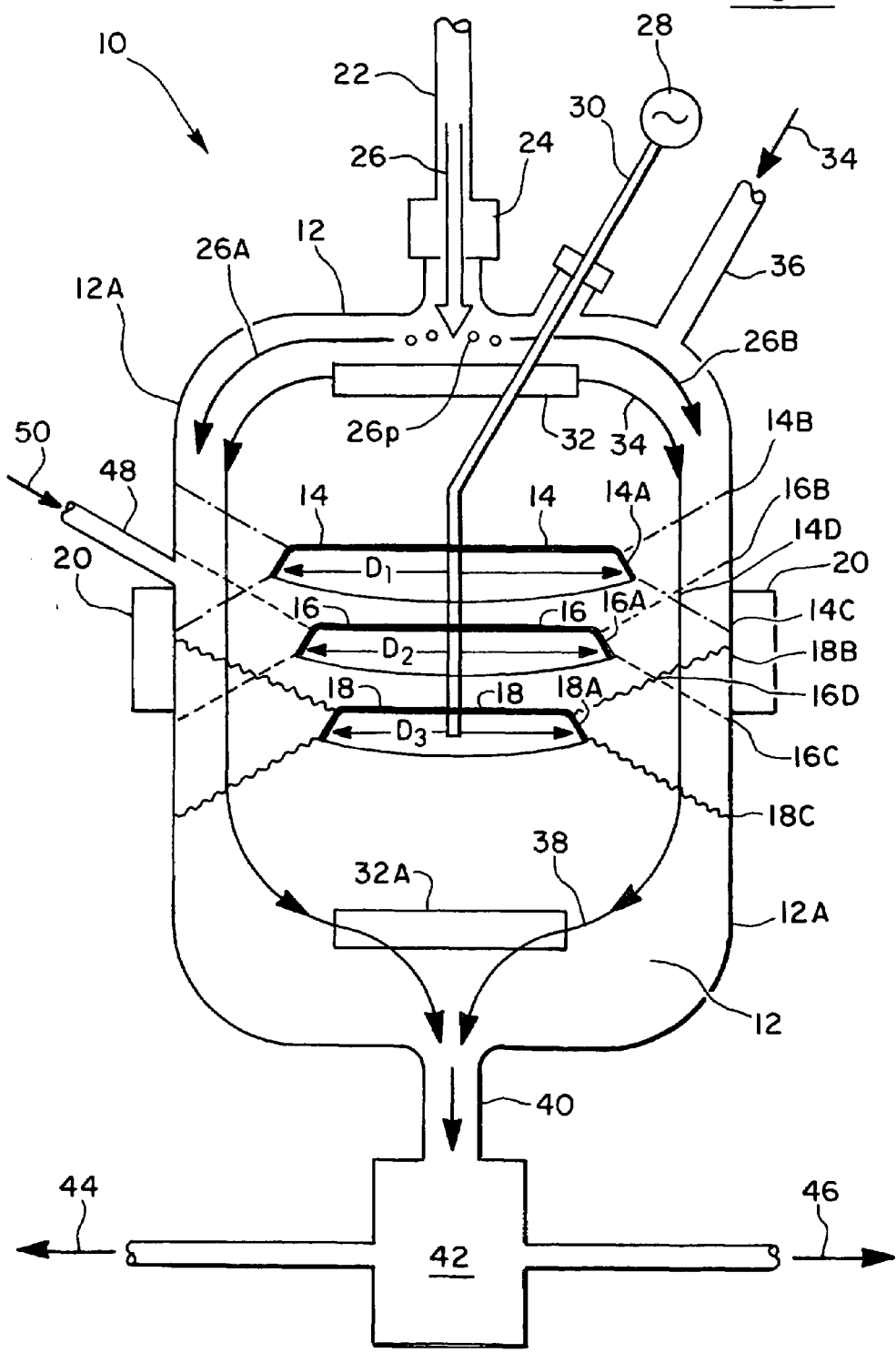
FIG. 1 depicts a preferred embodiment of this invention wherein an electrical excitation chamber is provided with three separate and distinct excitation electrodes within the chamber and one opposing electrode (i.e., grounding electrode) positioned outside of the excitation chamber.
Figure 2:
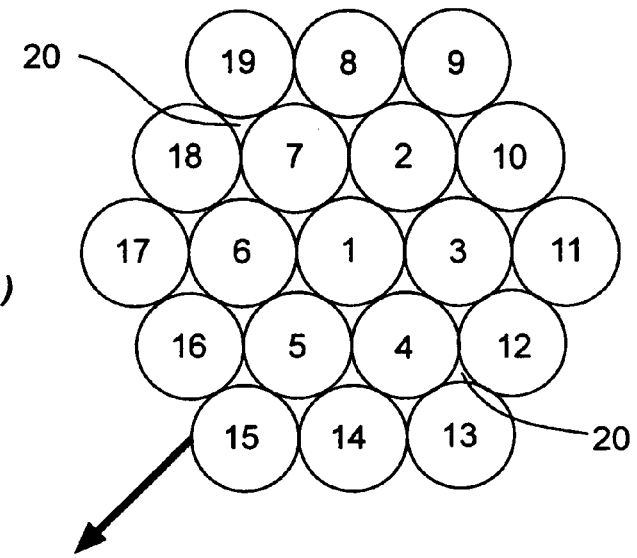
FIG. 2 depicts (in cross section) a general array of prior art, foamable beads that are generally separated by void spaces 20.
Figure 3:
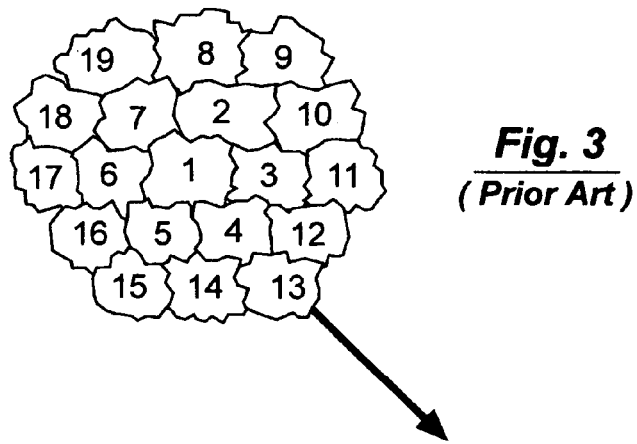
FIG. 3 depicts the result of heating the prior art foamable beads of FIG. 2 (e.g., by steaming). In effect, the individual beads become, to some degree, melded or joined together by the heat treatment. That is to say that the beads 1, 2, 3, 4, 5, etc. shown in FIG. 3 are no longer the distinctly round particles shown in FIG. 2, but rather are partially melded or joined to one another in a manner that substantially fills in the void spaces 20 depicted in FIG. 2.
Figure 4:
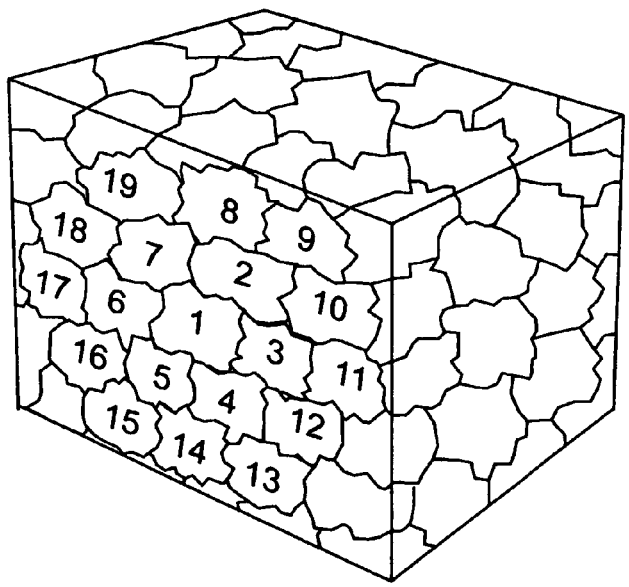
FIG. 4 depicts a three dimensional block of the material shown in FIG. 3. Such a three dimensional block of material can be created by molding operations known to this art, or can be cut from slabs to desired shapes for use as padding materials including padding for athletic equipment.
Figure 5:
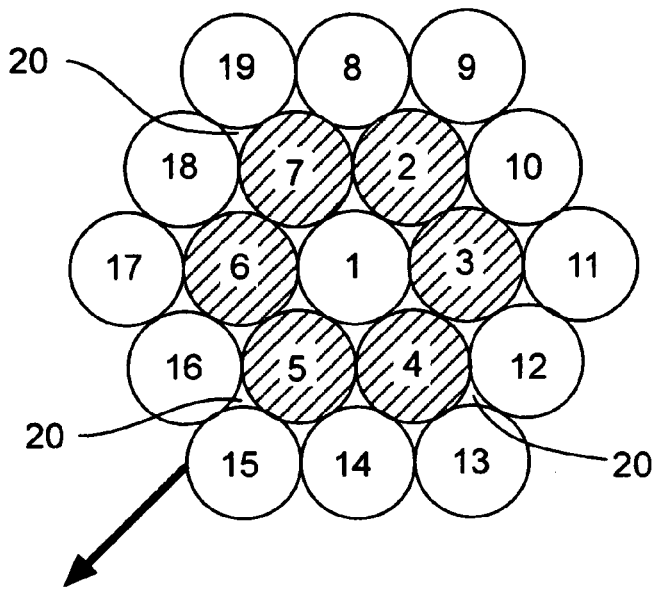
FIG. 5 depicts a prior art bead system similar to the one depicted in FIG. 2.
Figure 6:
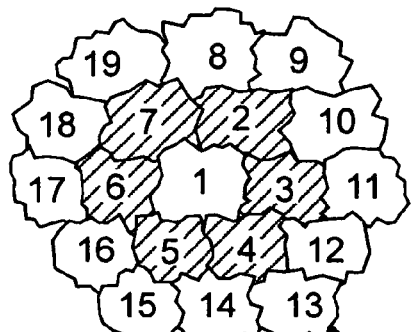
FIG. 6 depicts the result of melding the beads shown in FIG. 5 into a mixed bead system.
Figure 7:
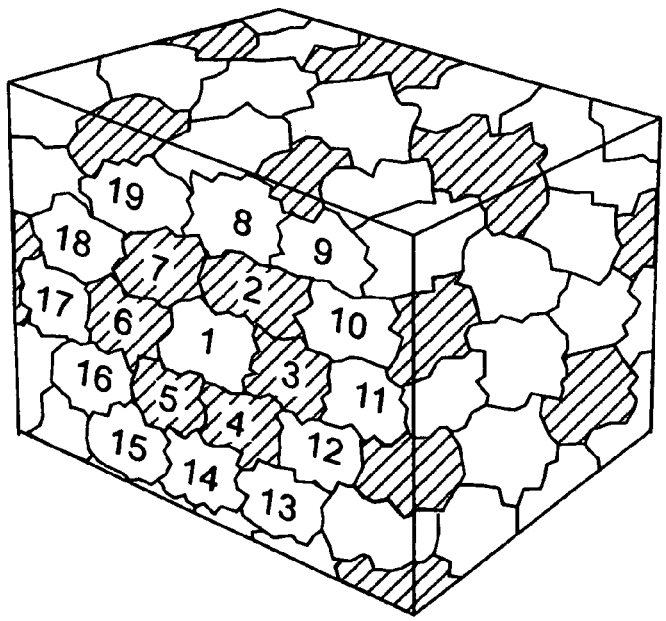
FIG. 7 depicts a three dimensional block of the material shown in FIG. 6. It should be specifically noted that the resulting materials shown in FIGS. 4 and 7 do not generally have distinct void spaces after the beads have been melded together by a heat treatment.
Figure 8:
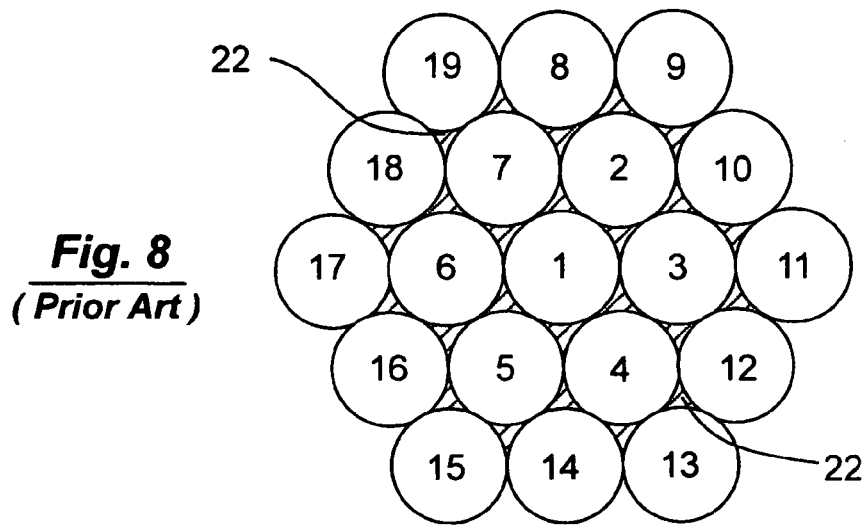
FIG. 8 depicts a prior art system comprised of beads 1-19 that are held together in a coherent unit by a polymeric material 22. This polymeric material 22, in effect, fills in all of the void spaces between the various beads.
Figure 9:
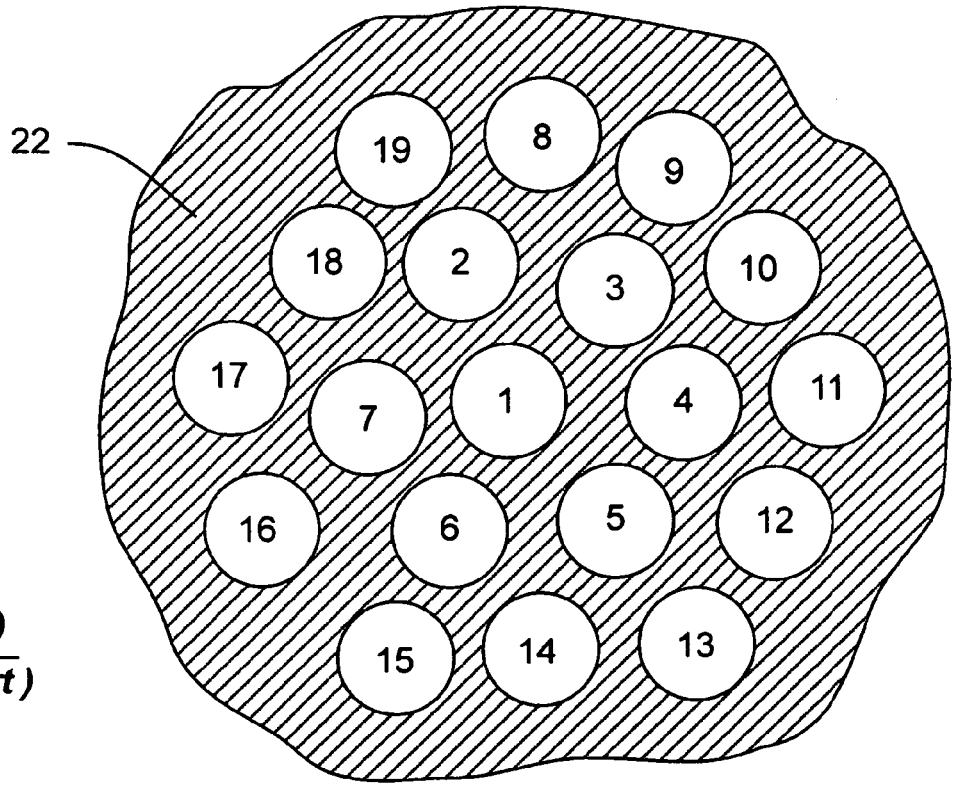
FIG. 9 depicts a prior art system wherein a polymeric material 22 used to associate the beads 1-19 is employed in proportions such that the beads may be considered to be "immersed" in said polymeric material 22.
Figure 10:
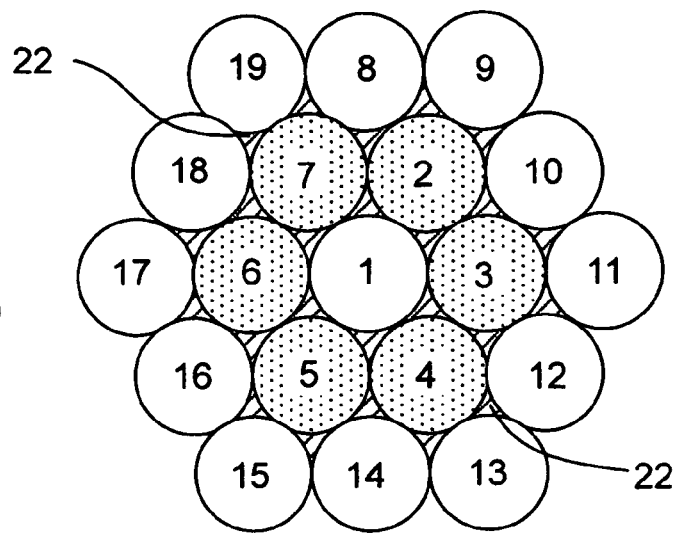
FIG. 10 depicts a prior art system similar to that shown in FIG. 8. It does however differ from the system shown in FIG. 8 in that some of the beads are made from materials different from the remainder of the beads. For example, in FIG. 10 beads 2, 3, 4, 5, 6 and 7 are depicted as being made from a material different from beads 1, and 8-19.
Figure 11:
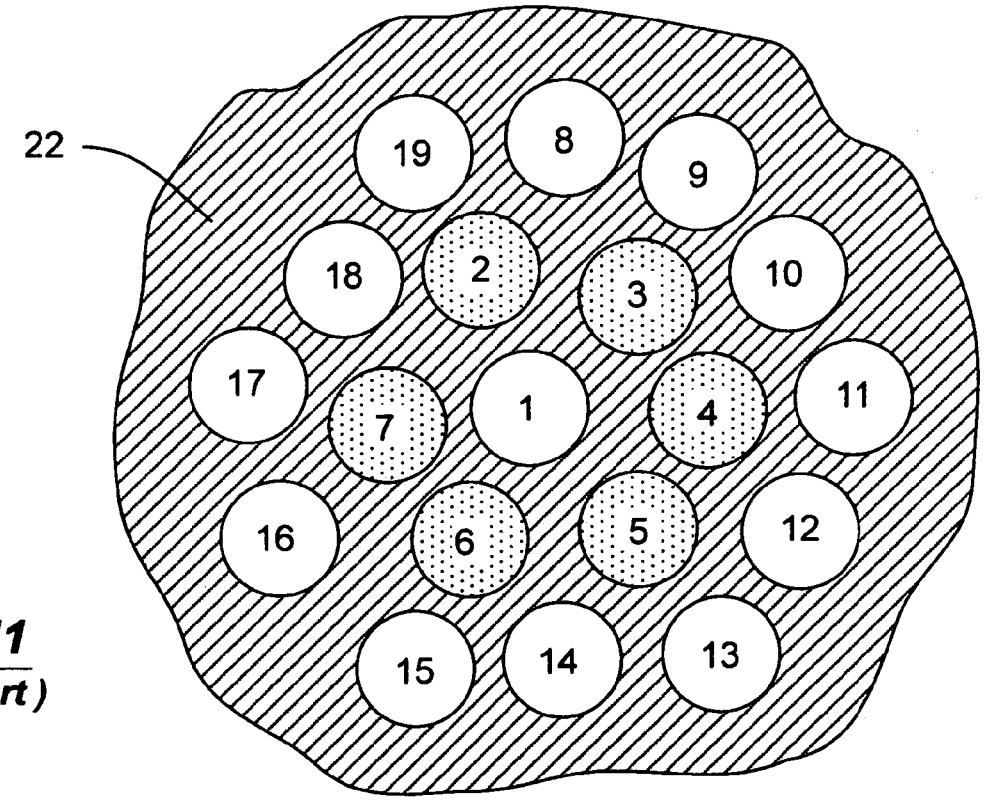
FIG. 11 shows a prior art system similar to that shown in FIG. 9 except for the fact that some of the polymeric material-immersed beads (i.e., beads 2, 3, 4, 5, 6, 7) are made of a material different from the material from which the remainder of the beads are made. All of the beads can be considered as being totally immersed in the polymeric material 22.

FIG. 1 depicts, in cross-section, a preferred apparatus 10 for carrying out a preferred process for treating polymer beads according to the teachings of this patent disclosure. The apparatus 10 has an electrical excitation chamber 12 that, in this preferred embodiment, is shown housing three separate and distinct excitation electrodes 14, 16 and 18. A single opposing electrode 20 is shown positioned outside of the electrical excitation chamber wall 12A. The electrical excitation chamber 12 (or at least that portion of the chamber which separates electrodes 14, 16 and 18 from the opposing electrode 20) is made of a dielectric material such as glass, a ceramic material or a polymeric material having suitable dielectric properties. Thus, in this preferred embodiment, the electrical excitation chamber wall 12A shown in FIG. 1 both physically and electrically separates electrodes 14, 16 and 18 from the electrically opposed electrode 20.

This physical arrangement of these electrically opposed electrodes serves to create an electrical field or electrical excitation zone between each of the respective electrodes 14, 16 and 18 and the opposing electrode 20. Such electrical field creations can be created in excitation chambers under positive gas pressures. However, in some particularly preferred embodiments of this invention, the creation of the required electrical fields can be enhanced through use of vacuum conditions (e.g., those ranging from about 5 to about 460 torr) in the excitation chamber 12.

The right end of the top electrode 14 of FIG. 1 is shown creating a generalized electrical excitation zone bound by lines connecting points 14A, 14B, 14C and 14A. Similarly, the right end of the center electrode 16 is shown creating an electrical excitation zone bounded by lines connecting points 16A, 16B, 16C and 16A. Likewise, the bottom electrode 18 is depicted creating an electrical excitation zone bound by lines connecting points 18A, 18B, 18C and 18A.

To illustrate another particularly preferred embodiment of this invention, these three electrical excitation zones are shown in FIG. 1 having overlapping regions. For example, the electrical excitation zone created by the top electrode 14 is shown overlapping the electrical excitation zone created by the center electrode 16 in the region generally bounded by lines connecting points 14D, 16B, 14C and 14D. Similarly, the excitation zone created by the bottom electrode 18 is shown overlapping the electrical excitation zone created by the center electrode 16 in the region generally bounded by lines connecting points 16D, 18B, 16C and 16D. Thus, use of these multiple excitation zones serves to increase the dwell time of a given bead in an excitation zone as well as subject it to differing excitation zone electrical intensities (and especially when the electrical excitation zones have overlapping regions). Each of the above factors can be employed to increase the bead throughput capacities of the bead treatment apparatus of this patent disclosure.

FIG. 1 also shows an opposing electrode 20 (e.g., an electrode that carries out an electrical grounding function) in a preferred physical form in a preferred mode of use, i.e., a belt or ring that snugly encompasses the outside surface of the electrical excitation chamber 12. The most preferred location for such a single, belt-configured, grounding electrode is generally opposite the center region of the 3 electrode array (i.e., generally laterally opposite the end of the center electrode 16 as shown in FIG. 1). In this preferred embodiment, the grounding electrode 20 is shown surrounding the outside surface of a tubular shaped excitation chamber 12. The use of opposing electrodes having other geometries (e.g., electrodes having block configurations) is also possible, but not preferred. The use of more than one opposing electrode is also possible—but, likewise, not preferred.

The electrical excitation electrodes are preferably connected to a common electrical power source 28 via electrical line 30. In the alternative, each excitation electrode may be connected to its own separate and distinct power source. In either case, however, some of the more preferred embodiments of this invention will employ from 1 to about 10 excitation electrodes (but most preferably from 3 to 4 excitation electrodes) powered by an electrical source that is preferably rated at between about 50 Watts and about 1000 Watts, at about 100 kV and 500 kV and having frequencies ranging from about 2 MHz to about 5 MHz. It also should be noted that these ratings are much greater than those (e.g., 4 Watts, 10 kV and 1 kHz) used to surface treat polymer films. For example, applicant has found that electrical excitation zones created by bead treatment devices having three electrodes connected to a common power supply 28 rated at about 756 Watts, about 250 kV and about 4 MHz are particularly well suited for surface treating polymer beads (e.g., those made of polypropylene, polyethylene, polystyrene, polyester and the like) having average diameters of from about 1 to about 4 mm without damaging said beads. Moreover, applicant's use of the above-noted, significantly higher, electrical power ratings, voltages and frequencies with respect to particles does not produce the previously noted problems (e.g., non-uniform treatments, heat damage to polymer materials, etc.) encountered in many prior art plasma or corona treatments of film-like polymer materials. Indeed, applicant has found that backside treatment of polymer beads is caused by the above noted higher power ratings, voltages and frequencies and that such backside treatment is a generally desirable attribute—as opposed to the prior art situation where backside treatment of film-like polymers is regarded as a serious detriment.

The geometries, sizes and separation distances of the excitation electrodes also can play significant roles in the overall practice of this invention. For example, FIG. 1 depicts electrodes 14, 16 and 18 as having saucer-like configurations which are particularly preferred for the practice of this invention. Differences in the diameters of the excitation electrodes 14, 16 and 18 (i.e., $D_1$, $D_2$ and $D_3$ respectively) of this patent disclosure also can play a significant role in the operation of the particle treatment apparatus of this patent disclosure. Applicant has, for example, found that those particle treatment apparatus having multiple excitation electrodes of differing sizes (and, hence, differing distances to the same grounding electrode 20) serve to provide higher operating efficiencies (i.e., higher bead weight throughputs per unit time of the apparatus of this patent disclosure). One particularly preferred embodiment of this invention (e.g., employing the above-noted 756 Watt, 250 kV, 4 MHz power supply) utilizes a saucer-shaped top electrode 14 having a diameter $D_1$ of about 8 inches, a saucer-shaped middle electrode 16 having a diameter $D_2$ of about 7 inches and a bottom, saucer-shaped electrode 18 having a diameter $D_3$ of about 6 inches. In the case of the use of a common power supply 28 (e.g., the previously noted 756 Watt power supply), these different electrode diameters can be used to create excitation zones of different electrical intensities (e.g., a distribution of different energies). Moreover, these electrodes 14, 16 and 18 are most preferably arranged in a descending order of size (e.g., 8, 7, 6 inches respectively) depicted in FIG. 1. Applicant has also found that, using the 756 Watt power supply noted above, employment of a belt-like ground electrode 20 having a width of about 1-4 inches is preferred. Under these same parameters, use of a tubular excitation chamber 12 having an internal diameter of about 10 inches gives especially good results in the case of treating polymeric beads having average diameters of from about 1 mm to about 4 mm.

The vertical distances between electrodes 14, 16 and 18 (and especially in the case of use of a common power supply 28) may also be adjusted to suit particular applications of these treatments to specific bead materials, sizes, throughput velocities, etc. Preferably, the vertical distances between the excitation electrodes 14, 16 and 18 will range from about 0.25 to about 1.5 inches—with vertical electrode separation distances of about 1 inch being preferred when used in conjunction with the above noted 756 Watt power supply. Use of differing vertical separation distances between the various excitation electrodes also may be employed depending on the power supply characteristics and the chemical nature of the beads being treated. To a certain extent, these vertical distances between said electrodes also will depend on the geometry and/or diameter of the excitation electrodes, the width of the grounding electrode 20 and/or its distance from the ends of the excitation electrodes.

FIG. 1 also depicts a generalized stream of polymeric beads 22 (see representative bead 26p) entering a top 24 portion of the electrical excitation chamber 12. This generalized stream of beads 22 (e.g., beads entrained in an air stream, inert gas stream, non-inert gas stream and the like) is shown being directed downward in one or more substreams 26, 26A, etc. When the electrical excitation electrodes have the saucer-like configurations depicted in FIG. 1, the bead substreams 26A, 26B, etc. generally flow around and downwardly past the circumferential edges of such saucer-like electrodes.

These substreams 26A, 26B, etc. are preferably directed in flow patterns that serve to force the beads they entrain through the electrical excitation zones created by the three excitation electrodes 14, 16 and 18. In some of the more preferred embodiments of this patent disclosure, the width of the most narrow electrical excitation zone (i.e., the distance between the end of the largest, saucer-shaped top electrode 14, and the wall 12A of the excitation chamber 12) will be from about 0.25 inches to about 8.0 inches (e.g., about 2.0 inches in the case of the use of the previously described 756 Watt power supply).

In another particularly preferred embodiment of this invention, the incoming stream of beads 22 will pass through one or more particle flow directing devices 32, 32A (so-called wobblers, suction creating devices, centrifuge devices, etc.) after said beads 22 enter the excitation chamber 12. For example, such a flow directing device 32 can subject the incoming beads to a flow action that directs the beads downwardly past the circular edge of the saucer-shaped top electrode 14 and through the underlying electrical excitation zone(s). In another particularly preferred embodiment of this invention, however, a suction type bead flow directing device 32A is placed in the lower regions of the chamber 12 so that it serves to pull streams of incoming beads 26A, 26B, etc. downward and through the electrical excitation zones. After passing through the last electrical excitation zone, the treated bead/gas mixture continues to flow in a downward path 38 and exits the electrical excitation chamber 12 via exit opening 40. Thereafter the resulting treated bead/gas mixture can be separated (e.g., by a separator 42) into a bead component 44 and a gas component 46.

In some embodiments of the practice of this invention also requires that the beads be mixed with a gas substantially before they reach the electrical excitation zones. This is the preferred case in creating chemical functional groups, cleaning foreign materials from particle surfaces and/or etching operations. Introduction of non-inert gases directly into the excitation zones may however be preferred in certain bead coating operations. Again, in the cases of corona, plasma, glow discharge treatments (or hybrids thereof) to carry out operations other than particle coating, the gas is preferably an inert gas such as nitrogen, argon and the like (as well as mixtures of such inert gases). These gases may be placed in the electrical excitation chamber 12 under pressurized conditions or under vacuum conditions. In case of deposition treatments, however, the gas is preferably a non-inert gas such as a hydrocarbon gas (e.g., an ethylene gas, methane gas and the like) that is capable of being deposited on a given species of polymer bead under the electrical excitation conditions existing in the electrical excitation zones. Such non-inert gases may likewise be employed under pressurized conditions or under vacuum conditions. The use of mixtures of inert and non-inert gases is also contemplated in the practice of this invention. It also should be appreciated that overall treatments may involve use of a first gas followed by use of a second gas. That is to say that the first gas can be used to treat beads and then purged from the excitation chamber. Thereafter, a second gas (then a third, fourth gas, etc.) is introduced into the excitation chamber to perform a second treatment function with respect to the beads.

In any case, FIG. 1 shows a stream of inert gas 34 entering an inlet port 36 near the top of the electrical excitation chamber 12. Preferably, this inert gas injection port 36 is located far enough above the top electrode 14 that a resulting bead/inert gas mixture is created before said mixture flows through the uppermost electrical excitation zone created by electrode 14. In certain less preferred, but still operable, embodiments of this invention such a bead/inert gas mixture can be created before even entering the electrical excitation chamber 12. For example, they can be created in a vessel (not shown) that is separate and distinct from the electrical excitation chamber 12. Such particle/inert gas mixtures also can be created in a flow directing device (e.g., flow directing device 32) that resides within the excitation chamber 12. FIG. 1 also depicts an embodiment of the processes and apparatus of this patent disclosure wherein a separate and distinct gas entry port 48 is provided for introduction of a stream of non-inert gas 50 directly into an electrical excitation zone the chamber 12. Thus, with appropriate valving (not shown) the non-inert gas 50 can be so introduced in place of the inert gas 34, or alternatively, the non-inert gas 50 can be mixed with said inert gas 34 or introduced after the inert gas is purged.

Applicant also has found that certain inert gases perform certain functions better than others, especially in those bead treatments calling for placement of certain desired functional chemical groups on certain kinds of foamed beads. Nitrogen and argon (and mixtures thereof) are particularly effective inert gases for such purposes. Carbon dioxide can also be employed, but it is somewhat less preferred. Indeed, some of the most preferred treatments of this patent disclosure can be directed at improving the adhesion qualities of certain polymeric beads—and especially with respect to their ability to adhere to one another—through use of tailored inert gas mixtures in the herein described processes.

The apparatus depicted in FIG. 1 is the most fundamental embodiment of this invention. In effect, it depicts a "batch" apparatus and process. The apparatus necessary to carry out continuous or semi-continuous type operations will involve more than one (and especially three) distinct vessels interconnected in series. At least one of these vessels may have an electrical excitation zone comparable to that depicted in the excitation chamber 12 depicted in FIG. 1. The excitation chamber may even serve as a connecting vessel between vessels (e.g., between a first and second vessel) of a three vessel series used to carry out a semi-continuous embodiment of the herein described processes. In such an apparatus consisting of three interconnected vessels, the center vessel could also be considered as the electrical excitation zone-containing vessel. The first vessel may pre-treat the particles and/or gases for introduction into the second i.e., electrical excitation zone-containing vessel. The second vessel will treat the beads and discharge them into a third vessel. These vessels will be interconnected in ways known to those skilled in the pressure vessel arts by valves (e.g., wobbler valves) that in one mode allow isolation of the vessels from each other and, in another mode, transfer of materials (particles, gases, etc.) between the vessels.

Another goal of the bead treatments of this patent disclosure is to obtain improved shelf life of a wide variety of polymer beads. Indeed, applicant has found that the shelf life of many polymeric beads can be extended from only 1 or 2 days to many months through use of the herein described processes. This improved shelf life is, for example, a particularly valuable attribute where foam slurries are employed to produce foam end products. For example, foam slurries of beads treated by the herein described processes can be made in liquid forms that can be shipped, e.g., to customer locations, and thereafter cured into solid foams that make up the breathable composite materials of this patent disclosure.

Advantages and Disadvantages of Different Types of Treatments

One of the main general objectives of the surface treating embodiments processes of this patent disclosure is to increase the surface tension and/or chemical reactivity of the surface molecules of various beads (but especially the surface molecules of polyolefin-based polymer beads). To this end, some form of gas ionization needs to be created in an electrical excitation zone. This is preferably done by applying a high voltage at a high frequency to an arrangement of two opposing electrodes insulated from each other by a dielectric material. When properly controlled, these conditions can create electrical fields that can ionize a gas in a gap between the two electrodes. This can be done in several ways under the most general teachings and scope of this patent disclosure. For example, the amperage, voltage and/or frequency of the power supply can be varied to produce corona, vacuum plasma, hybrid corona/plasma and/or atmospheric plasma treatments. To these ends, the gas pressure in the chamber can be varied in ways hereinafter more fully described. Since hybrid corona/plasma treatments are particularly preferred embodiments of this invention, they will be especially emphasized.

The presence of positive or negative gas pressures in the electrical excitation zones can also play an important role in producing different kinds of electrical excitation zones. Each of these various forms of electrical excitation has various advantages and disadvantages associated with its use. By way of example, vacuum plasma treatments use relatively low pressures to generate especially uniform plasmas. These uniform plasmas are especially well suited to bead decontamination operations because they create highly uniform bead surface treatments. Conversely, corona treatments generally employ relatively higher pressures and higher voltage electrical discharges (relative to the voltages of vacuum plasmas) that serve to create relatively less uniform, but more electrically violent, excitation fields. Thus, the corona treatments are particularly well suited to converting a given molecule from a non-polar state to a polar state such that oxygen molecules of other materials will be free to bond to the polar sites on a polymer bead surface that has been corona treated according to the teachings of this patent disclosure. That is to say that such corona treatments can be used relatively more effectively to increase the surface energy of a given bead surface. The electrical discharges by corona treatments are however, highly non-uniform in nature. It is to be particularly noted, however, that use of applicant's relatively high voltages (e.g., relative to those previously noted prior art devices used to treat film-like polymers) causes no backside discharge problems with respect to particles as they do with respect to polymer films. Indeed, applicant has found that backside discharges can serve to advantage in the herein described processes. Indeed, applicant has found that non-uniformity of corona treating can serve to better treat the backside surfaces of beads i.e., those surfaces that face away from the electrical path between an excitation electrode and the grounding electrode. However, applicant also has found that when corona treatments are used alone, they do not always acceptably treat all bead types since such treatments may be unacceptably non-uniform in nature using some bead types.

Applicant's Preferred Plasma Apparatus

Generally speaking, a plasma is an excited gas. The excited components (e.g., ions, electrons) that comprise a plasma will bombard materials placed within the electrical fields created by such plasmas, especially under low pressure or vacuum conditions. Such particle bombardments creates surface energy, and, in many cases, permanent changes in the surface molecules of polymer beads. Thus, by careful selection and control of various process parameters, a given bead's surface can be changed to fit specific needs. One of the most important attributes of applicant's plasma creating apparatus embodiment of this invention is its radio frequency generator. Those having radio frequencies of about 4 MHz are highly preferred. It also should be appreciated that, in general, a plasma creating machine creates a high field intensity at cooler temperatures than a corona creating machine. Indeed, their energized field(s) is (are) only a few degrees warmer than ambient conditions. This is not, however, the case with corona treatments. They use a power supply to excite a gas field and generate a great deal of heat because they treat a subject material by bombarding it with electrical discharges or arcs rather than radio waves.

At least, three types of plasma treatments are possible under the teachings of this patent disclosure. First, there is surface activation through plasma treatments. They employ gases (e.g., oxygen, nitrogen) that modify the hydrophilicity and reactivity of polymer surfaces. Second, there is plasma treatment reactions that can be used in plasma induced grafting operations. They employ inert gases (e.g., nitrogen, argon, helium, etc.) to break polymer molecules and thereby facilitates their subsequent cross-linking reactions. Depending on the process gas(es) used, a variety of chemical groups (hydroxyl, carbonyl, carboxylic, amino, peroxyl groups) can be created on the particle surface molecules. Such grafting operations are best carried out just after the beads pass through an excitation zone. To this end, a second gas stream (e.g., oxygen, allyl alcohol, nitrogen) is introduced just after excitation of the beads in order to add or graft molecules of one or more of these gases to the surface polymer beads. This condition facilitates covalent bonding of an adhesive material to the beads so that they can be assembled in suitable forms (e.g., foams, laminates, etc.).

The third general type of plasma treatment are so-called plasma depositions wherein gases such as methane, ethane, ammonia, tetrafluoromethane can be plasma polymerized and then used to coat particle surfaces (e.g., to a depth of 1-10 Angstrom Units). Such plasma depositions can utilize any gas whose molecules can be broken and thereafter undergo polymerization within the plasma induced zones employed in the herein described electrical excitation apparatus. Particularly preferred gases for such operations include nitrogen, oxygen (including ozone), ammonia and various hydrocarbon gases such as ethylene, propylene, organosilicon compounds (e.g., hexamethyldisiloxane, vinyltrimethylsilane).

With these points in mind, some embodiments of applicant's bead treatment apparatus were developed to eliminate those problems associated with undesired higher temperatures being applied to polymer films by prior art corona process. In effect, applicant combines certain features of corona processes with certain features of plasma processes. To this end, applicant uses a corona voltage generator as a power supply because this device would generate heat by using streams of electrical currents to excite the electrical field—as opposed to the use of radio waves. In effect, the heat energy given off by the current streams serves to help excite the treatment field.

A vacuum can be used to advantage in the plasma process to create a plasma field instead of a corona. Again, applicant has found that combinations of corona treatments and plasma treatments can create electrical excitation zones that are especially useful in three dimensional treatments of polymeric beads having average diameters from about 1 to about 4 mm. Generally speaking, applicant's incorporation of an atmospheric plasma process into these overall particle treatment processes is desirable because atmospheric plasmas are up to 100 times more intense than the plasma treatment in a vacuum. This is because, at atmospheric conditions, the reactive gas is much denser. Thus once excited, the ion and electron bombardments of atmospheric plasmas are much more intense than those of corona treatments.

Process re Foamed Beads

Polymeric expanded foam beads treated according the herein described processes can be used to make closed cell, highly porous foams having highly improved bead/adhesive bonding properties. Their surface tensions before and after such treatments are shown in table 1.

TABLE 1

| | Surface Tension (dynes/cm) Before Treatment | Surface Tension (dynes/cm) After Treatment |
|---|---|---|
| Polypropylene | 29-31 | 45-75 |
| Polyethylene | 30-31 | 45-75 |
| Polystyrene | 38 | 45-75 |
| Polystyrene (low Ionomer) | 33 | 45-75 |
| Polyester | 41-44 | 45-75 |

Such improved bonding properties were also verified by a series of tensile strength tests conducted on various foam materials. These tensile strength tests were conducted in accordance with ASTM-3475-00. In effect, the tensile strength of foams made with electrical excitation zone treated beads (e.g., (beads made of polypropylene, polyethylene, etc.) was compared to foams whose otherwise comparable beads were not treated in applicant's electrical excitation zones. By way of example only, in one test, a first batch of cross-linked polyethylene beads was subjected to a corona treatment according to the teachings of this patent disclosure. These treated beads were then combined with a polyurethane adhesive to create a first foam material. The average tensile strength of this first foam material was 1.67 lbs. A second batch of otherwise comparable cross-linked polyethylene beads was not subjected to the corona treatment. These untreated beads were likewise combined with the same polyurethane adhesive to create a second foam material. The average tensile strength of this second foam material was 0.33 lbs. Thus, the electrical excitation zone treatment served to produce a five fold increase in the tensile strength of the first foam material.

Other Operational Parameters

Again, the effectiveness of a bead surface treatment is a function of the electric field intensities through which the beads pass. It can be measured in terms of changes in the surface energies of beads after passing through these electrical fields. Such surface energies are measured in dynes per centimeter squared. These measurements also can be used as control functions especially when the bead treatment apparatus are dedicated to treating the same bead species. Of particular concern to this invention is the fact that the surface energy of a given particle such as a polymeric bead must be higher than the surface tension of an adhesive that will be used to create foams and the like from an array of such particles. For example, the surface energy of a polymeric bead should be about 10 dynes per $cm^2$ greater than the surface tension of an adhesive used to combine such a bead with comparable beads. It should be noted here that with the corona embodiments of this invention, or the plasma embodiment of this invention, the various surface tension values of a given particle, at a given power density, will increase in a generally proportional manner. However, the ultimate surface tension achieved (and amount of increase thereof) are dependent upon the material's starting surface tension. It also should be appreciated that variation of a given polymeric material's response to a corona treatment is often compounded by the loading of certain chemical additives (fire retardants, etc.) into the polymer material. It might also be noted in passing that the corona treatments may produce ozone when oxygen or air is present and that the ozone may enhance such treatments.

With just a corona, or the plasma, treatment, some polymer materials, such as certain polyesters react more readily, accept the treatments of this patent disclosure more readily and exhibit more rapid increases in surface tension under relatively lower power levels. Other materials, such as polyethylene, accept these treatments less readily, but will exhibit a significant increase in surfaced tension under moderately higher power levels. Some polymeric materials, however, such as polypropylene, are difficult to treat and may exhibit more moderate increases in surface tension under relatively high levels of power. Smaller, higher density beads of this kind are especially difficult to treat.

With applicant's hybrid corona (plasma process), the above problems associated treating different kinds of beads are minimized. Applicant has, for example, found that the hybrid corona/plasma process of this patent disclosure usually produce at least a 45 dyne/cm$^2$ treatment (or better), regardless of the polymer bead's chemistry. Thus, the apparatus for carrying out the hybrid processes can treat otherwise difficult to treat beads (e.g., polypropylene) from a low surface tension state to a high enough surface tension state that an adhesive will readily bond to a bead surface—with only one bead treatment. Thus, difficult to treat polymers (e.g., polypropylene) will exhibit dramatic increases in surface tension relative to the moderate increases in surface tension produced by applicant's plasma or corona treatments alone. Note for example that in Table 1, all of the polymer materials (including polypropylene) are raised to the same high levels of surface tension when comparing consistent dwell time between 1 and 10 seconds per any given process (e.g., corona, plasma, hybrid).

System Parameters/Material-Process Parameters

Some of the parameters of the herein described processes can be broken down into two very general categories: system limits and material-process limits. System parameters are governed by the corona/plasma system and apparatus design. Material-process limits are governed by the material, the additives in the polymeric material and process requirements. For example, with respect to apparatus design each type of electrode has an upper limit on the amount of power it can accept per applicant's saucer-shaped electrodes, their circumference. If, to achieve a certain power density, the power supply increases beyond the electrode's maximum rating, arcing (and hence undesired melting of polymer beads) will occur. Additional electrodes may be added to prevent this melting. Applicant has also found that use of stainless steel electrodes is preferred over those made of aluminum. Generally speaking, the higher the bead flow rate, the lower the maximum power density per bead is achievable. Speed, being inversely proportional to power density, impacts on the problem of increasing throughput efficiencies.

The various surface tension values of a given material may be influenced by several contributing factors, such as the method of manufacture (e.g., beads expanded by use of different blow gases), and amount of impurities which always exist in even the highest quality polymers. If a given polymeric material is treated at a given power density, its surface tension will be increased in a generally proportional manner. However, both the ultimate surface tension achieved and amount of increase are dependent upon the bead material's starting surface tension. It might be again noted that variation of a given polymeric material's response to corona/plasma treating is often compounded by loading certain additives such as fire retardants into such polymers.

As mentioned earlier, different polymeric materials or substrates react differently to corona/plasma treating. Some polymer materials, such as certain polyesters react more readily, accept the treatments of this patent disclosure more readily and exhibit more rapid increases in surface tension under relatively lower power levels. Other materials, such as polyethylene, accept these treatments less readily, but will exhibit a significant increase in surface tension under moderately higher power levels. Finally, some polymeric materials, such as polypropylene, are more difficult to treat and may exhibit only moderate increases in surface tension under relatively high levels of power. Polypropylene beads are often relatively more difficult to surface treat, especially smaller, higher density beads of this chemical type.

Continuous Bead Treatment

These particle treater processes can be adapted to treat beads in a continuous or semi-continuous manner. To this end, particles can be drawn into a top vessel (e.g., a top vessel of an interconnected three vessel series) by placing a vacuum in said top vessel. Vacuum pumps will extract the air pulled into the top vessel with the beads and thereby keeping the entire system at a steady state vacuum condition e.g., at approximately 20 torr. Nitrogen or a mixture of inert gases will then be injected around the electrodes. This gas will be used to keep the plasma field exited. Some of the outside air will mix with such nitrogen as a benefit to creating more reactive sites on the polymeric beads. When a bottom vessel of a vessel series is full, a valve will close. The bottom vessel will be pressurized to ambient pressure and the particles will be removed. Once the beads are removed, the bottom vessel will be evacuated (e.g., to about 20 torr). A valve between a $2^{nd}$ and a $3^{rd}$ vessel will open. Beads being treated during this time fall into the $2^{nd}$ vessel and are collected there until the valve reopens. Once the valve is opened these particles will fall into the $3^{rd}$ vessel. This process will continue until the bottom vessel is once again full. The cycle will then repeat. In some particularly preferred embodiments of this invention, an excitation chamber can serve to interconnect two vessels e.g., a first (top) and a second (center) vessel.

Surface Treatment of Foamed Beads

Again, the processes and apparatus of this patent disclosure can be especially adapted to improve a polymer bead's wetting properties. These properties especially influence how well adhesive coatings will flow over a bead's exterior surface. Thus, improved wetting properties, will enhance bonding between such beads when they are used to create shaped forms such as those foams used to make various three dimensional, shaped products. Generally speaking, if a bead's surface energy is lower than the surface tension of an adhesive placed on the bead, the adhesive will bead up and not adhere well to the polymeric bead. Conversely, when the bead's surface energy is higher than the adhesive's, the adhesive will effectively wet out around the bead, flowing out uniformly and providing maximum contact with other beads. This circumstance leads to improved adhesion between beads.

Most adhesives resist wetting on the surface of virgin-plastic beads, which are characterized by an inert, non-porous, low-energy surface. Moreover, many virgin-plastic beads, are made from polyethylene and polypropylene. Beads of these types tend to be very slippery and feel greasy to the touch. Getting coatings to permanently adhere to them is a relatively more difficult task. Thus, one goal of the surface treatments of this patent disclosure is to ensure that an applied durable adhesive coating will withstand any conditions or environments that the beads (and hence the shaped products made from them) might face. These conditions may include exposure to the elements outdoors, regular cleaning with detergents, and extremes in temperature and the like.

Electrical Power Characteristics of Preferred Surface Treating Apparatus

One widely used prior art preferred power supply unit for carrying out corona treatments on films is a 4 MHz, 60 milliamp system which uses a spinning electrode wheel assembly rotating at 3600 rpms to supply voltage spikes to a 4 MHz resonant frequency coil. Such a power supply unit will accept 50/60 Hz utility power and convert it into a single phase, higher frequency power. Such devices will preferably have one variable digital volt meter and digital ammeter to vary input voltage and milliamps. Most prior art corona treaters operate nominally between 10 to 30 kHz because at higher frequency levels, heat generation and back treatment become major concerns in their prior art applications—i.e., when surface treating films. Again, both heat generation and backside treating are undesirable when treating films, and thus have limited how corona treaters have been used in the past. These facts and circumstances are to be contrasted with the bead treater apparatus of this patent disclosure which preferably operates at about 250 kV. Such higher voltage levels have several advantages in the particle treatments of this patent disclosure. For example, at such higher voltages, power can be supplied to at least three tandem electrodes without arcing. It also is important when treating 3 dimensional beads that a uniform plasma be generated to get backside treatment as well as generate some heat to help intensify the electrical field—because this serves to boost bead throughput. It should also be appreciated that in the practice of this invention, treatment rates (lbs/hr) and tensile strengths may be related. For example, some foams show an increase in strength at 100 lbs/hr of around 600 percent. With variable voltage generators, one can vary the input voltage to change the output voltage. By changing the input voltages one can change the input current resulting in an increase in the power density of the plasma field. For example, an input current can be varied from 0.1 milliampere to 3 amps.

Operational Variations Between Corona Treatments, Plasma Treatments and Hybrids Thereof If the particle treatment apparatus of this patent disclosure is not provided with vacuum conditions within their electrical excitation chamber(s), they will generally constitute the corona treater embodiments of this invention. Such corona treatments will commence by turning on a voltage generator and sending a current going through a Tesla coil (e.g., a resonant frequency coil). Preferably, this current will be between about 0.2 milliamperes and about 3 amps. An even more preferred current setting would be between about 0.3 and about 0.6 milliamperes. A flow of particles, beads, etc. is then sent through the resulting corona field. Optimum flow rates of particles (such as polymer beads) through the corona field would preferably be predetermined e.g., by treating comparable particles at different flow rates and then spraying the resulting bead samples with a dyne solution to determine their surface energy. Such dyne surface treatment kits are commercially available.

By way of example only, the surface energy of many polymer beads is preferably made greater than about 45 dynes per square centimeter by the herein described processes. In most cases, it would not be necessary for such beads to have surface energies greater than about 75 dynes per square centimeter for successful practice of this invention. The preferred surface energy for most of the more preferred polymer beads will be about 55 dynes per square centimeter. Such surface energy levels are especially preferred when the surface of the beads are exposed to a liquid adhesive. It should also be noted that an electrical zone-excitable gas environment need not be continuously supplied within the excitation chamber for a typical corona treatment process.

By way of contrast, the plasma treater embodiments of this invention use a radio frequency generator to create their electrical excitation zone(s). The radio frequency is preferably between about 3 MHz and about 5 MHz. Most preferably, the frequency will be about 4 MHz. Such plasma type treaters provide a cold treatment means because the energized field will normally only be a few degrees warmer than ambient conditions when energized by, for example, 4 MHz radio waves. In order to better convert the apparatus of this patent disclosure into their plasma treater embodiments, vacuum conditions are put on their electrical excitation zone(s). The vacuum level will preferably be in the range of about 5 torr to about 50 torr. An electrically excitable gas (e.g., argon or nitrogen) will then be injected into the excitation chamber to create a plasma field. The hybrid corona/plasma treat embodiments of this invention also involve placing a vacuum in the excitation chamber. In these corona/plasma embodiments, the principle reason for a vacuum to be present in the excitation zone(s) is that there is usually not enough energy supplied by a radio frequency generator to energize a gas at pressures greater than about 100 torr.

It should also be noted that when a gas is injected into the excitation chamber, the vacuum gauge reading on a plasma treater will preferably go to about 20 to 50 torr. This is an increase in pressure from a preferred pump down pressure of about 5 to about 30 torr. In the case of the use of particle treatment apparatus having multiple vessels—especially those multiple vessel systems used to carry out continuous, or semi-continuous, operations (as opposed to the batch type operation depicted in FIG. 1). It might also be noted in passing that a top and a bottom vessel of a vertically arranged, three vessel embodiment of this invention, need not be pressure vessels because they would not see vacuum pressures. Be that as it may, the next step in such an operation would be to start the radio frequency generator component of the apparatus. Again, the radio frequency generator would preferably transmit a radio wave at about 4 MHz exciting the whole volume of the electrical excitation chamber of FIG. 1, or the second or center vessel of an apparatus comprised of a top vessel, center vessel and bottom vessel that may constitute a continuous (or semi-continuous) treatment embodiment of the apparatus of this patent disclosure. In any case, the electrically excited zone(s) will manifest themselves by a soft purple glow. Beads need not, however, flow continuously through this excitation field but, alternatively, can remain in the electrical excitation zone of the center vessel (or chamber such as that depicted in FIG. 1) until they are sufficiently treated. The amount of time to treat different bead polymer chemistries will vary. Preferred treatment times though, will generally vary between about 6 to about 12 minutes using just the plasma process. The estimated volume of a site glass area in a three vessel system is preferably from about 2 to about 3 gallons (or 7 to 10 liters). In any case, once the beads are adequately treated they will be released from a treatment vessel (e.g., the excitation chamber depicted in FIG. 1); or they will be released from a center vessel into a bottom vessel below a center or site glass vessel. The process can then be repeated.

If the corona process is combined with the plasma process of this invention, the resulting process can begin by pumping the center vessels (or the chamber depicted in FIG. 1) down to preferably about 20 torr. This pressure may, however, range from about 5 to about 50 torr. A voltage is then applied. The voltage generator also is preferably set to deliver the desired voltage at a current level of about 0.4 milliamperes. This amperage can however range from about 0.2 to about 3 amps. A purple glow would be seen in a site glass area of the excitation chamber around each electrode. It will generally extend outward toward a grounding strap. The gas flow would then be started. The gas flow would be in the range of 5 to 20 cubic feet of gas per hour. The preferred setting would be at about 10 cubic feet per hour. A vacuum pump control system can then be used to adjust the vacuum pump intake valve(s) to keep the system at a preferred steady state pressure e.g., at about 20 torr of pressure.

Leaving the vacuum pumps of this apparatus running during the hybrid corona/plasma treatment may facilitate several important advantages. First, by replenishing the gas, dirt and loosely linked polymers are swept away and exhausted to atmosphere. Second, a constant fresh source of gas is provided to the treatment field. Thirdly, if chemical deposition on beads surfaces using a polymer gas in conjunction with the excitable gases is desired, this is where and when this deposition process is best carried out. Fourth, a bottled gases can be used to cool the treatment field if necessary. In any case, an operator can then lower a wobbler valve (as described in the corona process) and set the revolutions of the valve. Here again, about 100 to 300 revolutions per minute (rpm) can be employed, with a 200 rpm speed being preferred. Applicant also has found that bead treatment rates can vary according to the bead chemistry, but the preferred range for most polymer beads will be between about 75 and about 300 pounds per hour with a particle treatment apparatus employing the 756 Watt power source previously noted. In the multivessel, continuous treatment embodiments of this invention once the beads contained in excitation vessel are treated and sent to the lower vessel, said lower vessel can be emptied and the process repeated.

Electrode Design

The particle treater shown in FIG. 1 is shown provided with three electrodes 14, 16 and 18. Each is precision machined and sized to prevent arcing from the electrode to the grounding strap 20. Experience has shown that any imperfection along the edges of the electrodes encourages formation of undesired arc paths. If an arc path is established, beads located within said path will be melted and bead flow through the particle treater will eventually stop. Once an arc path is established, the plasma field will also be lost or greatly reduced. Beads passing through other areas of the field will therefore not receive good surface treatments. Foam product made from arc-damaged beads will be brittle and have greatly reduced tensile and tear strength. Thus, great care should be taken to prevent formation of such electrode edge imperfections.

It also should be noted that each electrode in FIG. 1 is in tandem, and has a different diameter in a descending order $D_1$, $D_2$, $D_3$, etc. order of size. This arrangement may seem counter intuitive, i.e., that the smallest (i.e., 6 inch) electrode is the furthest away from the ground strap 20 and furthest away from a resonant frequency coil located near the top of the device. Applicant has, however, found that as the circumference of these saucer-shaped electrodes decreases, the distance from the grounding strap preferably increases. Moreover, when the electrodes reside in a vacuum, the distance from the electrode to the grounding strap is not nearly as critical as when the electrodes were located in an air atmosphere because air impedes electron flow. Applicant's experimentation has also shown that if the electrodes are of the same circumference only one of the three electrodes would be able to generate a suitable field. Moreover, applicant has found that if the electrodes are reversed, relatively less desired results would tend to occur. In effect, only one electrode is able to generate an effective field. If more power is added to the electrodes, arcing will emanate from the electrode generating that field.

Table 2 is a matrix of some of the more preferred power, voltage, frequency and air pressures used in various embodiments of this invention.

TABLE 2

|  | Corona | Plasma | Hybrid Corona/Plasma |
| --- | --- | --- | --- |
| Watts | 756 W | 756 W | 756 W |
| Volt | 250 kV | 250 kV | 250 kV |
| Freq. | 3 MHz | 4 MHz | 4 MHz |
| Vacuum | Atmospheric | 5 torr-1 Atm | 5 torr-1 atm |

Continuous Treater Vessel Systems

The treaters can also be designed for continuous treatment. To this end an array of serially interconnected vessels (e.g., three vessels connected in series) are attached to a common frame. The top vessel can be separated from the lower vessel by hydraulics. This is necessary in order to work on the electronics located within the treater vessel. Nitrogen or argon gas can be currently injected into an upper vessel just above the electrical excitation zone. A gas ring can be employed to distribute the gas around the outside diameter to position the gas and help the electrodes create a plasma field in the device.

Gas Ring of Continuous Treaters

A gas ring can be located just above a treatment area. The gases can be controlled with mass flow controllers. The gases are introduced into the evacuated chamber and maintained at a reduced pressure by a vacuum pump and throttle valve. After the gas pressure is stabilized, e.g., at approximately 20 torr, the gas is energized by the 4 MHz coil. A vacuum system can be used to pull the gas through the beads as they are being treated. The vacuum system also removes unwanted impurities and gases produced by the plasma bombardment.

Wobbler Valves of Continuous Treaters (1) One or more wobbler valves can be used to advantage in the practice of this invention. They are especially useful in embodiments of this invention involving continuous processes employing a series of vessels. Generally speaking, these valves can travel in a concentric circle to keep beads flowing in the throat of the apparatus of this patent disclosure. For example, beads can flow by gravity from a top vessel through the remainder of a multivessel apparatus for carrying out the herein described treatments. The wobbler valve restricts the flow of the beads so that each bead is in the excited plasma field for a given period of time determined by experimentation and type of bead polymer chemistry. To improve process bead flow, such a wobbler valve can be made to rotate or spin while traveling in a concentric circle. Use of wobbler valves that do not rotate is possible, but less preferred. The rate of rotation is preferably adjustable e.g., 1 from about 100 rpm to about 300 rpm. An air motor that is adjusted by varying the input air pressure can power the head of the valve doing the rotating. The air motor replaces an electric motor because the electrical field generated in a plasma field would magnetize the small motor over time and eventually preventing operation. Rotation of such a valve also provides a means to tumble the beads as they move downward through the plasma field insuring that an even surface treatment is established on each bead.

Representative Polymer Materials

The term "polymer," as used herein, includes homo-polymers, co-polymers and/or their blends and alloys with other polymers and/or natural and synthetic rubbers, and polymer matrix composites, on their own, or alternatively as an integral and uppermost part of a multi-layer laminated sandwich comprising any material e.g. polymers, metals or ceramics, or an organic coating on any type of substrate material. The term "polymer" also should be taken to include thermoset and/or thermoplastic materials. By way of examples only, the polymeric materials which can be surface modified by applying the present invention include, but not limited to, polyolefins such as low density polyethylene (LDPE), polypropylene (PP), high density polyethylene (HDPE), ultra high molecular weight polyethylene (UHMWPE), blends of polyolefins with other polymers or rubbers; polyethers, such as polyoxymethylene (Acetal); polyamides, such as poly(hexamethylene adipamide) (Nylon 66); halogenated polymers, such as polyvinylidenefluoride (PVDF), polytetra-fluoroethylene (PTFE), fluorinated ethylene-propylene copolymer (FEP), and polyvinyl chloride (PVC); aromatic polymers, such as polystyrene (PS); ketone polymers such as polyetheretherketone (PEEK); methacrylate polymers, such as polymethylmethacrylate (PMMA); polyesters, such as polyethylene terephthalate (PET); and copolymers, such as ABS, ethylene propylene diene mixture (EPDM).

Padding Material Components

Figure 13:
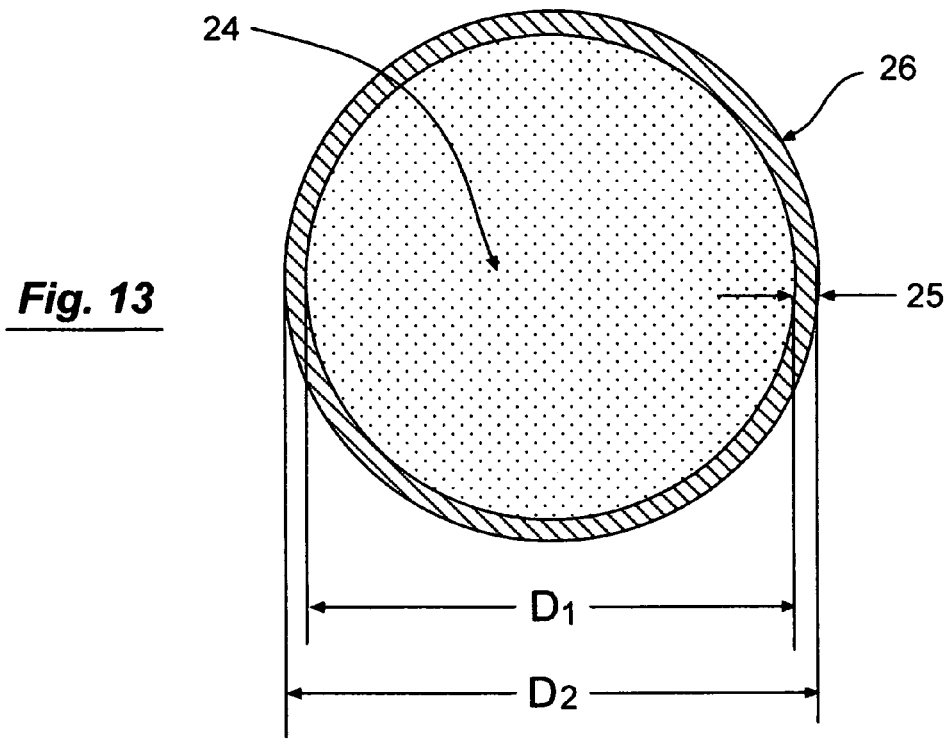
FIG. 13 depicts a basic component of the composite materials of the present patent disclosure. It shows a single solid bead 24 covered by a layer of adhesive material 26. The bead 24 can be made from an inelastic material or an elastic material.

FIG. 13 depicts a basic building unit of one of the more preferred padding materials of this patent disclosure. This particular basic building unit is a solid, electrical excitation zone-treated bead 24 that is spherical in shape and substantially uniformly covered by a layer 26 of an adhesive material. This spherical configuration of the bead 24, and uniformly thick 25 adhesive coating 26, can be thought of as an "idealized" system. Those skilled in this art will however appreciate that commercially available beads may well have other configurations, idealized or otherwise (e.g., truncated spheres, ellipsoids, truncated ellipsoids, cubes, cylinders, tear drop shapes and the like). For example, several representative bead configurations that can be used in making applicant's padding materials are shown in a product brochure published by Porex Technologies Corp. (Fairburn, Ga.) entitled "Porex® Porous Plastics High Performance Materials" and said brochure is incorporated herein by reference.

Be the bead sources as they may, must be made of materials that will respond to the pretreatments of this patent disclosure so that bonding qualities between the bead's outer surface and the adhesive layer placed on that outer surface in order to make the padding materials of this patent disclosure. Such beads can, for example, be made of inelastic materials or elastic materials. For the purposes of this patent disclosure the term "inelastic" can be taken to mean the bead's inability, upon deformation, to substantially return to its original shape. In other words, the material has no so-called "memory" as to its former (pre-deformation) shape. Conversely, the term "elastic" can be taken to mean a bead material having a memory, and hence the ability to return to its original shape after being deformed.

Figure 15:
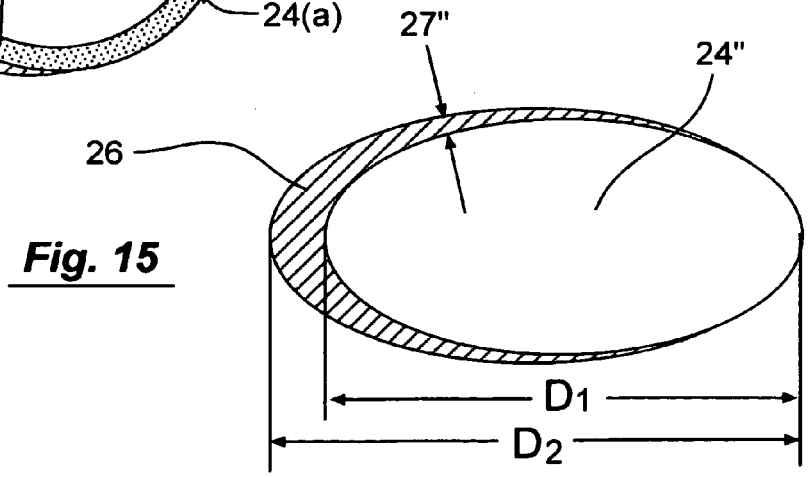
FIG. 15 depicts a solid bead having an ellipsoidal configuration that also can be used in the practice of this invention.

Whatever their shape, construction material, degree of elasticity or surface treatment experience, the electrical excitation zone-treated, beads of this patent disclosure generally will have (on average) a diameter $D_1$ (as measured on a bead's longest dimension—see for example $D_1$ of the ellipsoidal bead of FIG. 15) ranging from about 1 mm to about 6 mm. Beads having average diameters ranging from 1 to 3 mm are, however, somewhat more preferred. It is even more preferred that the beads of this patent disclosure have average diameters ranging from about 1.5 to about 2.5 mm. In some of the more preferred embodiments of this invention, these beads, no matter their size, shape or method of manufacture will be made from plastic or phenolic resin materials in ways well known to those skilled in the bead making arts. By way of example only, a useful representative method for making round beads is taught in U.S. Pat. No. 4,441,905 ("the '905 patent"). Hence, the teachings of the '905 patent are incorporated herein by reference. Other useful representative bead manufacturing methods are taught in U.S. Pat. Nos. 4,989,794; 4,751,203; 4,751,202; and 5,292,840. Again, some of the most preferred resin compositions for the manufacture of applicant's beads will include polystyrene, polyethylene, polypropylene and especially ethyl propylene copolymers ("epps").

The electrical excitation zone-treated bead 24 shown in FIG. 13 is depicted, in cross section, as being a solid that is provided with a layer of adhesive material 26 that substantially uniformly coats the entire outer surface of the spherical bead 24. The thickness 27 of such a coating of adhesive material 26 preferably will range from about $5\times10^{-6}$ mm to about 2 mm. Thus, upon curing of the adhesive, the overall diameter $D_2$ of the idealized, bead/adhesive layer system shown in FIG. 13 will preferably range between about 1 mm and about 10 mm. Again, in some of the more preferred embodiments of this invention, the diameter of the beads will range from about 1 mm to about 3 mm. and the thickness of the adhesive layers coated thereon will range from about $5\times10^{-6}$ mm to about 2 mm. Hence, such fully coated beads may range in size (left side coating layer, plus bead diameter, plus right side coating layer) from about 1 to about 7 mm. Again, the adhesive layer placed on applicant's beads may be of substantially uniform thickness—or of varying thickness. To some degree, such uniformity will depend upon the method (auger mixing, spraying, immersion, etc.) by which the bead is coated.

Figure 14:
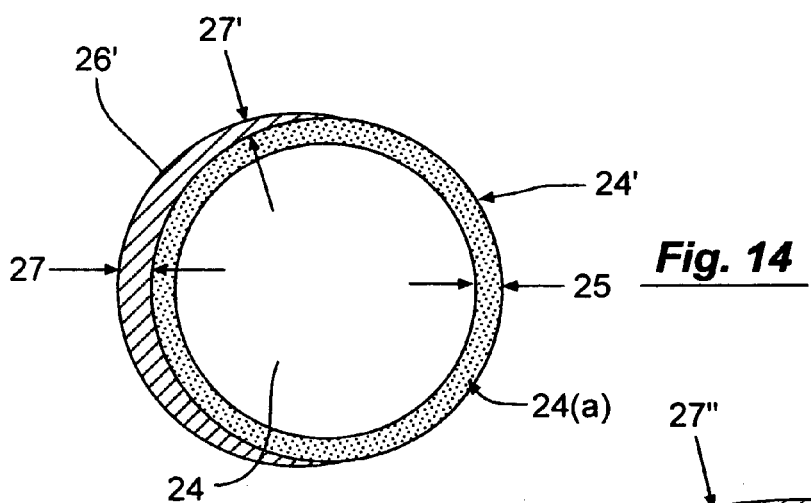
FIG. 14 depicts a two component bead that also can be used to make the hereindisclosed composite materials. The bead has an inner, solid, bead 24 having a cover layer 24(*a*) of bead material that is different from the material from which the inner bead 24 is made. Thus, the resulting bead has two components 24 and 24(*a*) that each can be made of elastic or inelastic materials. This two component bead is shown about 50% covered with an adhesive layer 26 of varying thickness 27 (27').

Again, the solid, spherical bead 24 in FIG. 13 is shown completely covered with a layer of adhesive 26 of substantially uniform thickness 25. This idealized circumstance is to be contrasted with the spherical, two-layered bead 24' shown in FIG. 14 wherein said two layered bead 24' is only partially covered (e.g., about 50% of its surface area) by an adhesive layer 26' whose thickness 27, (27') is not uniform. That is to say that the adhesive layer 26' shown in FIG. 14 has a greater thickness 27 on the far left end of the bead than its thickness 27' on its upper left side. The right side of the bead is shown having no adhesive coating whatsoever.

By way of another departure from the idealized bead/adhesive system depicted in FIG. 13, FIG. 15 illustrates, in cross section, an embodiment of this invention wherein the electrical excitation zone-treated bead is an ellipsoidal solid 24". It is shown provided with a layer (of varying thickness) of adhesive 26 on about 80 percent of its surface area. Again, many different bead body configurations can be used in the practice of this invention (e.g., truncated spheres, truncated ellipsoids, cubes, bar-like configurations, cylinders, tear drop configurations and the like). This all goes to say that the coated beads of this patent disclosure may have a wide variety of geometric shapes (or mixtures of geometric shapes) so long as their longest dimension is between about 1 and about 10 mm. It might also be noted in passing here that this invention contemplates use of (1) different shaped beads, (2) different sized beads, (3) beads of different construction materials, (4) beads provided with varying thicknesses of different kinds of adhesive materials, (5) solid beads, (6) hollow beads, (7) beads having holes through their bodies, (8) use of coupling agents to aid bead/adhesive bonding (e.g., use of titanates and silane for this purpose) and mixtures of beads having any combination of the just noted attributes (1) to (8) in the same padding material.

FIG. 16 shows a system of four solid, coated beads (1, 2, 3 and 1') in an idealized, two dimensional, row-like orientation. Those skilled in this art will appreciate that, in actuality, these beads will display the hereinafter described row-like features in a three dimensional sense. In any case, in FIG. 16, the space between beads 1 and 2 is shown filled in with an adhesive material 26. Similarly, the space between beads 2 and 3 is shown filled in with adhesive material 26. The space between bead 3 and sequence repeating bead 1' is however shown as being a void space 20. Thus, it can be said that every third bead is provided with a void space. This is the preferred minimum requirement for the void spaces of the padding materials of the present patent disclosure to be considered as being "regularly spaced" as this term is used in this patent disclosure.

FIG. 17 shows a more preferred embodiment of this invention wherein every second bead is regarded as being regularly provided with a void space. This is a more preferred form of "regular" spacing of the void spaces in applicant's padding materials. FIG. 17 also shows an embodiment of this invention wherein bead 1 is a hollow bead, bead 2 is a solid bead and bead 1' is a hollow bead. Thus the overall system can be regarded as a mixture of hollow and solid beads bound together according to the teachings of this patent disclosure. Those skilled in this art will, of course, appreciate that hollow beads also are well known to this art. For example, the previously cited '905 patent shows how hollow or solid beads can be made using various versions of the thereindisclosed technology. Moreover, the outer shells of applicant's hollow beads may be made of inelastic or elastic materials. Thus, the term "elastic" is not necessarily premised on the bead being hollow, but rather on the elastic nature of the bead forming material.

FIG. 18 depicts a still more preferred embodiment of this invention where substantially every bead (e.g., beads 1, 2 and 1') is provided with a void space e.g., void spaces 20 in a three dimensional sense. This is the most preferred form of "regular" void spacing according to the teachings of this patent disclosure and to some degree represents a highly idealized embodiment of this invention.

FIG. 19 shows a generalized system of another highly idealized bead/adhesive/void space system. The individual beads 1, 2, 3, 4, 5, 6 and 7 therein are shown to be solid in nature and substantially fully coated with respective, uniformly thick, layers of adhesive, i.e., layer 26(2) on bead 2, layer 26(3) on bead 3, etc. Thus, these beads can be thought of as being a part of a coherent, three dimensional, body by virtue of the fact that most of their respective adhesive coatings are in physical contact with—indeed melded with—the adhesive coatings of adjacent beads in that body. That is to say that the adhesive coatings of adjacent beads adhere to each other, in large part, by virtue of a bonding action between their originally liquid adhesive coatings. These coatings generally extend from the bead system's adhesive-to-adhesive contact or meld regions around a major portion of a given bead. Consequently, the beads are bonded to each other at the points of contact of their respective adhesive coatings. For example, in FIG. 19 bead 1 is bonded to the beads (1-7) by the adhesive-to-adhesive contact points 1(2), 1(3), 1(4), 1(5), 1(6) and 1(7). This adhesive-to-adhesive bonding action can be brought about by simply drying "wet", "liquid" (or "semi-liquid") or "tacky" adjoining adhesive coatings in ambient conditions. Such drying also can be accelerated by thermal or electromagnetic wave treatments of the wet or tacky adhesive coatings on adjacent coated beads.

In any case, applicant has found that such adhesive-to-adhesive bonds withstand impact type forces much better than bead-to-adhesive bondings or bead-to-bead bondings. Hence one of the underlying principles of this invention is to assure that a large percentage (e.g., at least 50%, preferably at least 80% and most preferably substantially 100%) of the beads are provided with such adhesive-to-adhesive bondings. This melding at their adhesive-to-adhesive contact points is preferably brought about by contacting the adhesive composition with the beads while said adhesive is at a temperature of about 20° F. to about 200° F. Most preferably this contact will take place when the adhesive is at temperatures ranging from 50° F. to 150° F. In any case, the adhesive-to-adhesive system created by these adhesive bonds becomes a subsystem within the overall bead/adhesive/void space system. Given the presence of this adhesive-to-adhesive system, impacts upon materials made from such a bead/adhesive/void space system are to a large degree distributed through the body of adhesive material coated on the outside surfaces of the coated beads.

As previously noted, a most important aspect of this invention also resides in the fact that the void spaces 20, 20', 20", etc. shown in FIG. 19 exist between various subsets of the bead/adhesive system on the substantially "regular" bases previously described after the adhesives on adjacent beads have been bonded to each other. This regularly appearing void space system gives applicant's padding materials those porous, breathable qualities that are especially desired in padding used in athletic or medical equipment. In other words, the drying or curing of the adhesive layers on the beads is such that the void spaces 20, 20', 20", etc. shown in FIG. 19 are not substantially filled in with the adhesive material in the manner that the prior art bead systems depicted in FIGS. 8, 9, 10 and 11 of this patent disclosure are filled in with a polymeric material.

Figure 12:
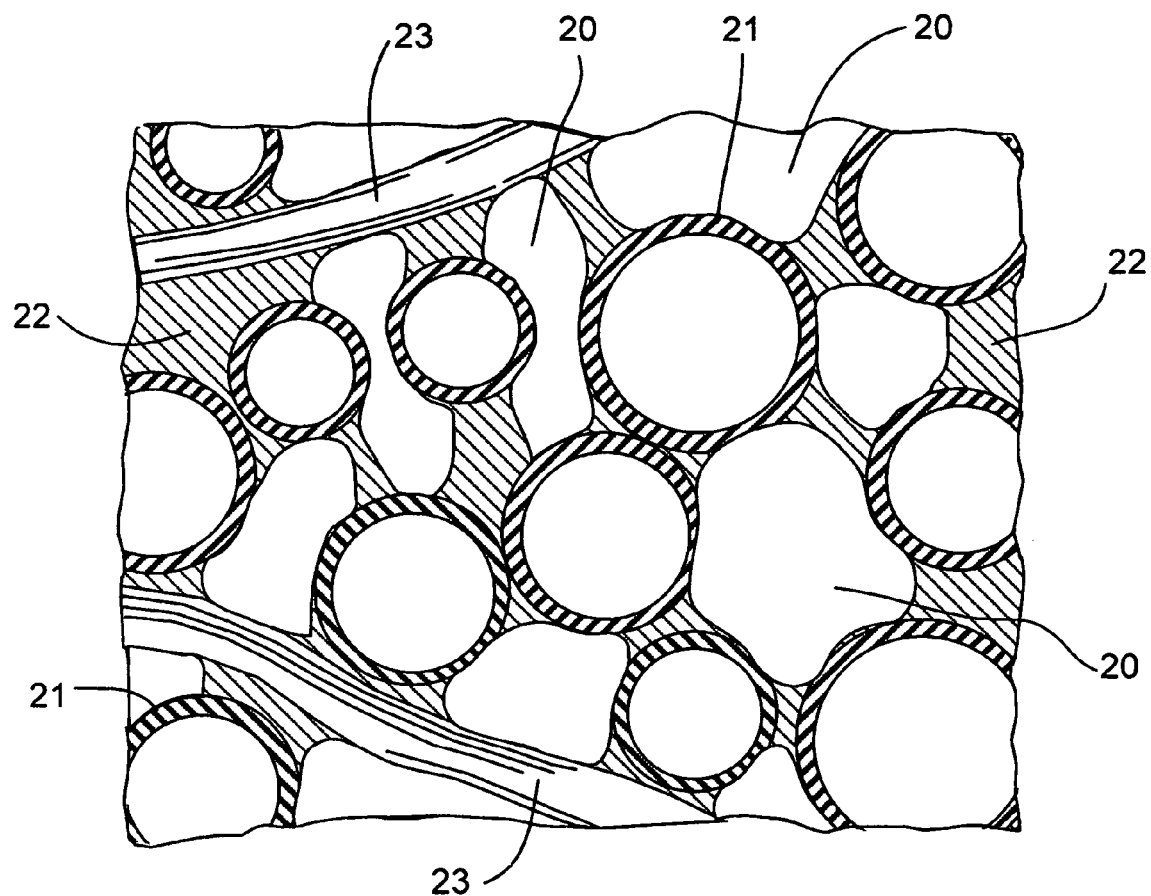
FIG. 12 shows a prior art padding material (as taught by FIGS. 2A and 2B of the '231 patent) made from hollow ceramic microspheres that are held together in a coherent body by a resin material that interconnects the individual beads. The resulting material also has distinct void spaces 20 and fibers distributed throughout its structure.
Figure 12A:
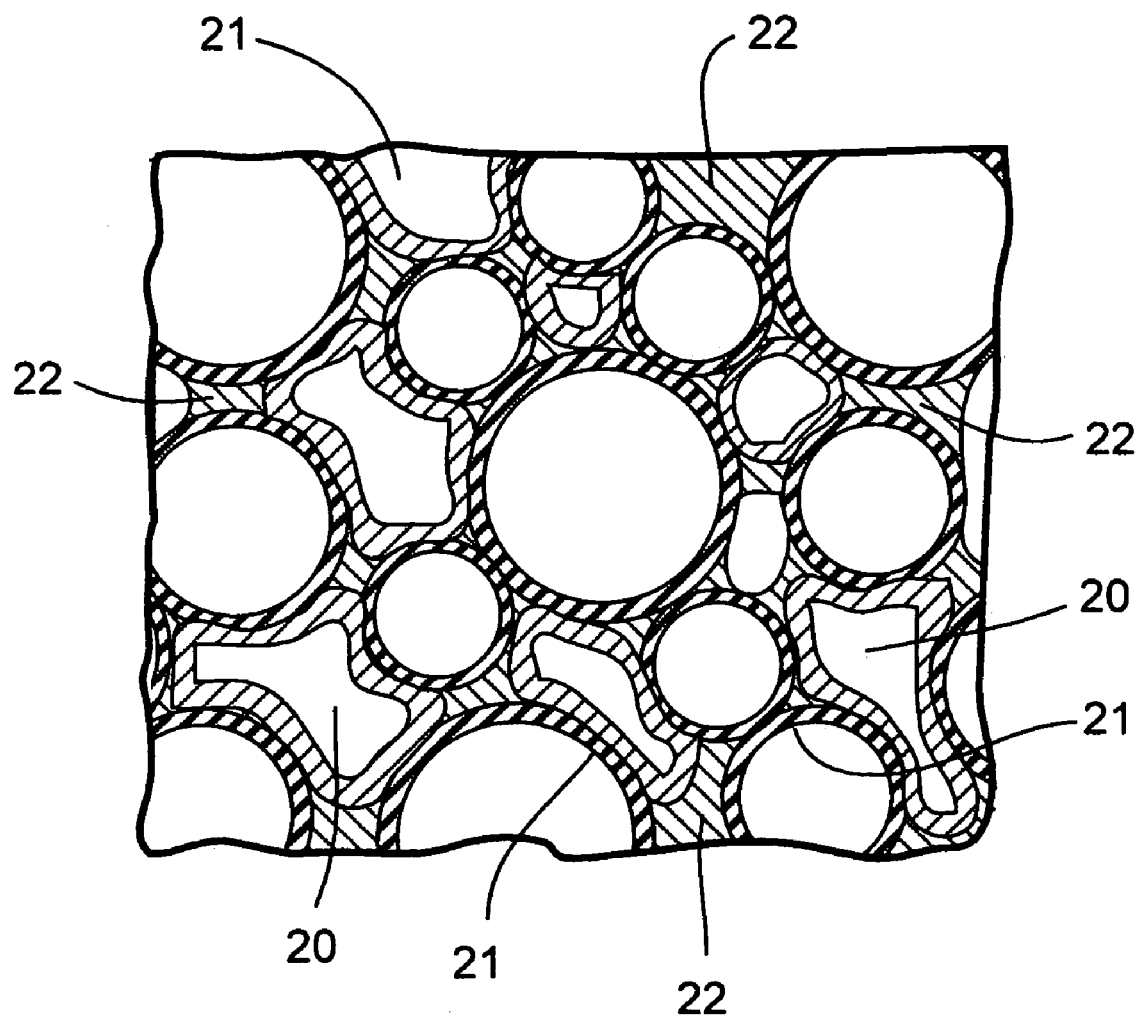
FIG. 12A shows a prior art padding material (as taught by FIG. 10 of the '642 patent) made from hollow microspheres and two distinct kinds of resin—one of which forms microballoons when heated. This material has distinct void spaces 20.

It also should be noted the applicant's void spaces are more regularly spaced than the void volumes 20 appearing in FIGS. 12 and 12(a). This regularity also tends to place applicant's void volumes in direct fluid communication with each other relative to the void volumes depicted in FIGS. 12 and 12(a). Again, the regularity and fluid communication in applicant's padding materials follows in large part from the fact that applicant contacts his adhesives with his beads while the adhesive is in a liquid state that does not involve melting of the adhesive components of applicant's formulations. Again, by way of contrast, the bead/resin/void space systems depicted in FIGS. 12 and 12(a) are produced by melting dry resin particles while they are in the presence of the hollow microbeads of that material.

Applicant also has found that the presence of such substantially regularly spaced void spaces (in three dimensions) can be so created when the amount of adhesive coated upon (e.g., by auger mixing, spraying, immersion, etc.) a given amount of beads represents from about 20 weight percent to about 80 weight percent of the resulting padding materials of this patent disclosure. More preferably, applicant's adhesive/total padding material weight ratio will be such that the adhesive will represent from about 40 to about 60 weight percent of a given end product padding material. That is to say that such weight ratios will exist after the adhesive has fully dried or cured to an extent such that virtually all of its volatile components have departed.

By way of an example of the effects of changes in the amounts of adhesives used in these formulations, applicant has determined that when beads (solid or hollow beads, made from inelastic or elastic materials) having diameters ranging from about 1 mm to about 6 mm are coated with an amount of adhesive that upon drying or curing, constitutes about 40 weight percent of the resulting padding materials, at least about 50% of the beads have surface areas that are at least about 50 percent covered with the said adhesive. Such padding materials also will have void volumes of from about 10 to about 40 volume percent of the total volume of the resulting padding material i.e., the volume of the overall bead/adhesive layer/void volume system. When however, the same beads described in the previous example were mixed with an amount of adhesive that, upon drying, constituted about 50 weight percent of applicant's end product materials, about 90% of the resulting adhesive coated beads will have surface areas that are at least 80 percent covered with the adhesive and the void volume of the materials still falls well within the lower end of desired 10-40 volume percent level. Applicant also would note in passing that adhesive percentages (50-60 weight percent) that produce void volumes of about 30 to 35 volume percent are somewhat more preferred in the practice of this invention.

Applicant also has established that there is an upper limit to this adhesive/bead weight ratio. Generally speaking, applicant has determined that if a padding material otherwise made by the teachings of this invention is comprised of more than about 80 weight percent (or more than about 5 volume percent) of adhesive, the void volume of that padding material becomes, in effect, "filled in" by the adhesive. Such circumstances are generally depicted in the prior art related FIGS. 8-12 of this patent disclosure. Thus, these prior art figures also depict "excessive" use of the adhesive according to the teachings of the present patent disclosure. Again, this follows from the fact that the resulting padding material loses one of its most important attributes for some applications—its breathability—when its void spaces are filled in by the adhesives. Hence, applicant prefers to use the adhesive materials in amounts such that the void spaces in the resulting material will represent at least about 10 percent of the padding material's entire volume. Padding materials having void volumes ranging from about 30 to about 40 volume percent of the total volume of the resulting padding material are even more preferred. To this end, applicant has found that the adhesives in these padding materials (in the adhesive's cured form) will, most preferably, constitute no more than about 60 weight percent of the end product padding material.

Many of applicant's more preferred padding materials use adhesives that are far more dense than the bead materials. For example, in one particularly preferred polystyrene/adhesive formulation used in the practice of this invention, applicant has found that use of 1% (by vol.) more of the adhesive produced a 25% gain in the weight of the resulting padding material. Use of 2% (by vol.) more adhesive produced a 39% increase in the padding material's weight. Similarly, use of 3% (by vol.) more adhesive led to a 48% increase in weight while use of 4% (by vol.) more adhesive usage produced a 55% weight gain in the end product material.

Applicant also has found that use of more than about 5% (by volume) of adhesive in the padding materials of this patent disclosure produced end products having rather poor breathing qualities. That is to say that applicant has found that use of more than about 5 volumes percent adhesive in the padding material of this patent disclosure tends to clog or fill in the void volumes to such a degree that they lose much of their breathing qualities. It might also be again noted that the higher densities of the adhesives relative to the beads used in the practice of this invention are such that the above noted 5% by volume adhesive generally corresponds to a padding material comprised of about 80% by weight adhesive. Thus, applicant's invention calls for the use of adhesive components that represent from about 10 to about 80 weight percent of the resulting padding material. This range generally corresponds to use of about 1 to 5 volume percent adhesive in the padding materials of this patent disclosure.

FIG. 19A depicts a departure from the idealized bead/adhesive/void space system shown in FIG. 19. Beads 1, 2 and 7 in FIG. 19A are shown in circumstances wherein these three beads are not completely covered by a uniform layer of adhesive. Moreover, bead 7 is shown partially melded into the bodies of beads 1 and 2. Thus, beads 1, 2 and 7 are associated with each other by this melding of the bead material rather than by the melding of an adhesive coating on the contact regions of these particular beads. In effect, the void space 20" shown in FIG. 19 has been filled in by the partially melded bodies of beads 1, 2 and 7 depicted in FIG. 19A. Moreover, bead 7 is no longer attached to bead 6. FIG. 19A is employed to show that occasional occurrences of this bead-to-bead melding can be tolerated in applicant's padding materials to some degree. It can not however predominate. Thus, in the more preferred embodiments of this invention, the remaining void volume of applicant's padding material shown in FIG. 19A (i.e., void spaces 20, 20', etc.) should still constitute at least 10 volume percent of the padding materials of this patent disclosure. That is to say that even if some bead-to-bead melding has taken place (and, hence, filled in void volumes such as that depicted by item 20" of FIG. 19) this bead-to-bead melding will not take place to such an extent that the void volume of the padding material will be less than about 10 volume percent.

FIG. 20 depicts another idealized bead/adhesive/void space system made according to the teachings of the present invention wherein the beads are of the same size, but are not made of the same material. For example, beads 1 and 8-19 are depicted as being made of a material different from the remainder of the beads. Moreover, beads 2, 4 and 6 are depicted as being made from materials different from beads 3, 5 and 7. Moreover, some of these beads may be hollow (e.g., beads 10, 13, 16 and 19) while others are solid. Moreover, some of these solid beads may have holes passing through their otherwise solid bodies (see for example, beads 11, 14 and 6). These holes may allow air to pass through some of the beads and thereby add to the breathability of the overall padding material. It also should be noted that regardless of whether the beads are solid, hollow or solids having holes they can be made of inelastic materials while others are made of elastic materials. The resulting system should, however, still be characterized by the presence of regularly spaced void spaces 20, 20', 20", etc. that constitute at least about 10 volume percent of the material and by the fact that all of the adhesive-coated beads in this mixed bead type system will have average diameters ranging from about 1 mm to about 10 mm.

FIG. 21 depicts a bead/adhesive/void space padding material of this patent disclosure wherein some of the beads are of different sizes. Moreover, some of these different-sized beads are solid while others are hollow and while still others are depicted as being made of materials different from the remainder of the beads. Solid bead 4 is shown having a hole 4(1) passing through its diameter region. The same is true of bead 11 which has a hole 11(1) passing through its diameter region. Bead 13 has two such holes 13(1) and 13(2) passing through its bead body. The bead/adhesive/void space system shown in FIG. 21 also indicates that some of the beads (e.g., beads 3, 9 and 10) are not covered by any adhesive coating. Preferably less than 20 percent—and more preferably less than 10 percent (by weight), and most preferably less than 5 percent (by weight)—of the beads in a given padding material of this patent disclosure will fail to be at least 50 percent coated with an adhesive.

In any case, those skilled in this art also will appreciate that by blending beads of various sizes, the volume of the individual voids or interstitial spaces can be varied. By way of example, the void spaces 20' and 20" shown in FIG. 21 are shown to be considerably larger than the "idealized" void volumes 20, 20', 20" etc. shown in FIG. 19. Those skilled in this art also will appreciate that the idealized void volumes 20, 20', 20", etc. shown in FIG. 19 represent about 26 volume percent of the idealized, theoretical system depicted in FIG. 19 wherein all of the spherical beads are assumed to be of a uniform size. Thus, the spaces 20' and 20" shown in the bead system of FIG. 21 represent the means by which applicant's padding materials can have void volumes that are greater than, or less than, the theoretical 26 volume percent of the idealized system shown in FIG. 19. For example, if the relatively large void spaces 20' and 20" shown in FIG. 21 were of such relative sizes, the resulting padding material could have a void volume greater than the theoretical 26 volume percent of the system shown in FIG. 19. On the other hand, if the relatively large void spaces 20', 20" in FIG. 21 are to a large degree filled in with the adhesive material, the void volume of the resulting system can be less than the theoretical 26 void volume percent of the idealized system of FIG. 19. Again, the adhesives used to make applicant's padding materials are used in quantities (to weight percent of the resulting padding material) such that the void volumes of applicant's padding materials will range from about 10 to about 40 volume percent with void volumes of about 30 to 35 volume percent being somewhat more preferred.

Applicant has found that one simple, straightforward method by which the adhesive-to-adhesive bonding action, bead/adhesive weight ratio and void space requirements can be achieved is by mixing the liquid adhesive with the beads in an auger type mixing and conveying device known to those skilled in this art. In effect the liquid adhesive is accurately metered into an auger-driven flow of the dry beads in order to thoroughly mix and blend the liquid adhesive with the dry beads at the required ratios. In any case, the end result of applicant's construction methods is that adjacent beads within a given body of the padding material will remain in substantially fixed positions relative to each other after the adhesive coating materials on the beads bond with each other. Consequently, the pads of the present invention will be highly breathable, impact resistant and will not bottom out under the influence of repeated blows.

Representative Uses of Composite Materials Used as Padding Materials

FIG. 22 represents some representative uses of the padding materials of the present invention wherein said padding materials are especially adapted for use in various items of football gear. Other sports gear or sports gear components can of course be made from the hereindisclosed padding materials. Such materials also are well suited for use in medical equipment such as prosthetic devices, wheelchair cushions, mattresses and the like. And as previously noted, the qualities of light weight, impact resistance (and breathability) make these materials well suited as padding in certain, non-human body-related/usages such as padding for construction purposes (e.g., padding materials for building foundations, under floors, between walls, padding for mechanical equipment, packaging for perishable goods (e.g., eggs, fruit, etc.) and air (or other gas) filter materials. Be that as it may, the football gear shown in FIG. 22 includes a liner jersey 28 with upper arm 30, rib 32, and sternum 34 pads. Such gear also can include liner pants 36 with thigh 38 and knee 40 pads as well as a helmet 42 with head pads 44 and 44'. Liner gear such as jersey 28 and pants 36 can be worn by a football player right next to the body. External gear such as full shoulder pads and exterior or playing jerseys and pants can be worn over such liner gear. Such exterior gear also can be similarly padded with materials made according to the teachings of the present invention. It should of course be appreciated that applicant's padding materials can be easily adapted for use in many other types of sports padding devices including separate and removable pads such as the elbow 46 and forearm 48 pads depicted in FIG. 22.

FIG. 23 is a cut-away view of the elbow pad 46 of FIG. 22 employing padding material made according to the teachings of this invention wherein a coated bead 52/void space 54 material is placed in an outer casing 56. The outer casing 56 is preferably made of a cloth-like or net-like material that is porous and breathable (e.g., plastic mesh or net of a substantially waterproof material such as polypropylene). In use, the entire pad 46 can be received or sewn into a pocket 50 formed by portions 58 and 60 of the jersey 28 depicted in FIG. 22.

FIG. 24 shows a padding material 62 made according to the teachings of this patent disclosure placed in two distinct casing sections 64 and 64'. These casing sections 64 and 64' are each associated with an outward facing, hard plastic cover 66 that is connected to the casing sections 64 and 64' by means of rivet-shaped connectors 68. Such a system could be used as a thigh pad, rib pad and the like.

Bead Construction Materials

The beads of this invention can be made of various materials e.g., plastics, ceramics (including glass), metal oxides, phenol based resins, etc. For example, in the "plastics" group, expanded ethylene, polystyrene and polypropylene are preferred bead construction materials for both elastic and inelastic bead materials. Ceramic, glass and metal oxide are somewhat preferred construction materials for the inelastic beads of this patent disclosure. One method for producing ceramic beads is described in U.S. Pat. No. 4,239,519 ("the '519 patent"). For example, the '519 patent teaches how gels containing 5 to 6% solids will form ceramic-forming droplets that consistently have a spherical shape. Beads made from ceramic materials may, however, also be somewhat resistant to those treatments (etching, corona treatments, etc.) that often effect better bead/adhesive bonding in other bead construction materials such as the previously noted plastics.

Plastics and resins are preferred for making elastic and/or hollow beads that can be used in applicant's padding materials. Such plastics are generally made from resins through the application of heat, pressure, or both. Such resin materials generally fall into two broad categories: (1) thermoplastic resins, which can be heated and softened innumerable times without suffering any basic alteration in characteristics; and (2) thermosetting resins, which, once set at a temperature critical to a given material, cannot be resoftened and reworked. Thermoplastic resins and thermosetting resins have the advantage of readily accepting corona, flame, plasma jet and etching treatments.

The principal kinds of thermoplastic resins that can be used to make the beads of this invention include: (1) acrylonitrile-butadiene-styrene resins; (2) acetals; (3) acrylics; (4) cellulosics; (5) chlorinated polyethers; (6) fluorocarbons, polytetrafluoroethylene; polychlorotrifluoroethylene, and fluorinated ethylene propylene; (7) nylons (polyamides); (8) polycarbonates; (9) polyethylenes (including copolymers); (10) polypropylenes (including copolymers such as ethyl propylene copolymers ("epps")); (11) polystyrenes; and (12) vinyls (polyvinyl chloride). The principal kinds of thermosetting resins that can be employed to make the inelastic beads suitable for the practice of this invention include: (1) alkyds; (2) allylics; (3) the aminos (melamine and urea); (4) epoxies; (5) phenolics; (6) polyesters; (7) silicones; and (8) urethanes.

As previously noted in this patent disclosure, applicant has defined "inelastic" beads as those that will not recover to their original shape after an impact or extended compression. By use of the term "inelastic", applicant means that a bead material has what is commonly referred to as poor "memory". Hence, after deformation, such materials will not return to their original shape and will not retain much of their original impact attenuation properties. In effect, many individual beads in such a system are permanently crushed. It might be noted in passing here that applicant's test for material elasticity was to place a 0.5 inch piece of a subject foam under a device which compressed the foam at ambient conditions to 50 percent of its original thickness. The pressure was then released. By way of example only, after 30,000 compression cycles of this test, applicant noted only a 10 to 15 percent reduction in thickness in certain elastic polyethylene foams and a 20 to 25 percent reduction in thickness for certain elastic polypropylene foams. Similarly tested inelastic foams however remained substantially at their compressed thicknesses indefinitely.

Adhesive Materials

The adhesives that can be employed in the practice of this invention are generally characterized by the fact that they (1) can be placed in solution or suspension (colloidal or otherwise) in liquid (or semi-liquid) carrier fluids (polar, non-polar, organic, inorganic) known to this art and (2) will cure to hardness levels of Shore A 20 to shore A 95. The carrier fluids used to convey such adhesive materials should be capable of acting as a carrier for a particular adhesive material components of applicant's adhesive compositions as well as being capable of wetting the surface of the bead material being employed to make a given padding material. Beyond that, the adhesive components of applicant's carrier/adhesive systems may be broadly classified into two main groups; organic and inorganic. The organic adhesives can be subdivided into those of animal origin, vegetable origin, and synthetic origin. Other useful classifications for those adhesives that can be used to make the hereindescribed padding materials are based upon the chemical nature of the adhesive. Such chemical classifications usually comprise (1) protein or protein derivatives, (2) starch, cellulose, or gums and their derivatives, (3) thermoplastic synthetic resins, (4) thermosetting synthetic resins, (5) natural resins and bitumens, (6) natural and synthetic rubbers, and (7) inorganic adhesives.

Two part thermoplastic or thermosetting adhesive systems are somewhat preferred for the practice of this invention. They usually consist of a resin and a hardener. The resin typically has a polyol or bulk polymer component. The hardener causes this polymer to link up, chain extend, harden and/or cure. Those skilled in this art will appreciate that the term "resin" typically refers to the base stock used in an adhesive. With less preferred, but still operable, single component adhesives, the resin will have most, but not all, of the bonding power of the final product.

Thermoplastic synthetic resin adhesives comprised of a variety of polymerized materials such as polyvinyl acetate, polyvinyl butyral, polyvinyl alcohol, and other polyvinyl resins; polystyrene resins; acrylic and methacrylic acid ester resins; cyanoacrylates; and various other synthetic resins such as polyisobutylene, polyamides, coumarone-indene products, and silicones also can be employed in the practice of this invention. Other thermosetting synthetic resin adhesives that can be used in the practice of this invention will include phenol-aldehyde, urea-aldehyde, melamine-aldehyde, as well as certain condensation-polymerization materials such as furane and polyurethane resins. Adhesive compositions containing phenol-, resorcinol-, urea-, melamine-formaldehyde, phenolfurfuraldehyde, and the like also can be used in the practice of this invention.

The adhesive containing compositions of this patent disclosure also may contain such additives as tackifiers, viscosity modifiers, anti-oxidants, UV inhibitors, UV stabilizers, catalysts, heat stabilizers, oxygen scavengers, colorants, biocides, odorants, etc. It might also be noted in passing that applicant has found that Dibutyl Tin Dilaureate (a general purpose organo-tin catalyst) used at 0.075% loading (a 1:1333 catalyst to adhesive ratio), can serve as a particularly good adhesive curing catalyst. In all such variations, however, the cured form of the adhesives should have Shore A values ranging from about 20 to about 95. Adhesives having hardness levels (in their cured state) ranging from about Shore A 50 to a Shore A value of about 90 are even more preferred in the practice of this invention when used in conjunction with inelastic thermosetting or high temperature thermoplastic bead materials. Those cured adhesives having hardnesses levels ranging from about a Shore A 60 to about Shore A 85 are even more preferred for use with such beads.

Some of the more preferred, commercially available, adhesives that can be used in the practice of this invention, and their relative attributes, are as follows:

| Adhesive | Qualitative properties |
| --- | --- |
| Rubinate 9272 ® | Low hardness, low strength, high flexibility, high elongation, moisture curing polyurethane. Especially good for soft bead products. |
| Rubinate 9234 ® | High hardness, high strength, brittle, moisture curing polyurethane. Especially good for hard bead products. |
| Rubinate 9457 ® | Medium high hardness, medium high strength, fair flexibility and elongation. Good for medium hard bead or hard bead products requiring some flexibility. |

Experimental Findings Re: Impact Tests

Applicant's experimental findings have established that, when used in the hereindescribed proportions (20-80 wt. %, or 1-5 vol. %), certain adhesives (those having hardness levels ranging from about Shore A 20 to Shore A 95) play an important part in the ability of the hereindisclosed bead/adhesive/void space padding materials to repeatedly absorb high levels of impact energy. This finding was primarily established through use of various impact tests. For example, in one series of such impact tests (so-called Acceleration Peak (G) tests) whose results are shown below as Test 1 below, applicant kept the percent of adhesive constant at 2 volume percent and varied the "hardness" of the adhesive. This variation in hardness was accomplished by increasing the number of chemically active sites of the adhesives by adding varying amounts of a second chemically active component to a base resin system. For example in polyurethane formulations, the relative amount of a N=C=O component of the adhesive was varied relative to a NH—C—NH component of said adhesive. Such tests indicated that as the hardness of the adhesive material used to create the subject bead/adhesive/void space materials of this patent disclosure was increased, the material's impact absorptive ability increased as well. These tests also indicated that the adhesive itself (and not just the beads) contributes greatly to the impact absorption qualities of applicant's padding materials.

For example, line 1 of Test 1 shows that when the subject padding material employs beads designated as bead type 3420 (spherical, high density, polypropylene beads) and uses 2% (by vol.) of a "soft" adhesive designated as 9272, the Acceleration Peak (G) value ("AP(G) value") is 107—for the first impact upon that material. This 107 AP(G) value represents good impact resistance for this material—on the first impact. The second impact (see line 2 of Test 1), however, produced an AP(G) value of 272. This value indicates a substantial lessening or deterioration in the impact resistance of the material whose attributes are given in line 1. The third impact (line 3) produced an AP(G) value of 465. This value indicates that the padding material's impact resistance greatly deteriorated under the three impacts to a level (465) which is such that the material would not be considered an acceptable padding for high impact sports gear.

Line 4 of Test 1 shows that when the padding material employs the same bead (3420) and the same volume (2%) of a "harder" adhesive (adhesive 9457), under otherwise comparable test conditions, the AP(G) value for the first hit was 95. This 95 value is qualitatively "better" than the 107 value for the padding material described in line 1, i.e., the padding material of line 4 is a better padding material than the material described in line 1—under the first impact. The second impact upon the padding material described in line 4 produced an AP(G) value of 182 (see line 5 of Test 1). This 182 value is better than the 272 value produced by the second hit on the material described in line 1. Similarly, the third hit upon the material of line 4 produced a 266 AP(G) value which is much better than the 465 value for the third hit upon the material of line 1. Thus, these tests show that the harder adhesive (9457) produces better repeated blow impact resistance in padding materials of this type relative to the softer adhesive (9272).

Lines 8 and 9 of Test 1 show the results of a series of tests comparable to those described above. The spherical bead employed (bead 3419) was, however, considerably softer than the bead employed (bead 3420) in the previous tests. A padding system using this softer bead (3419) and the softer adhesive (9272) as indicated in line 8 of Test 1 produced a first impact AP(G) value of 493. By way of comparison, the padding system using the softer, bead (3419) and the harder adhesive (9457) described in line 4 of Test 1 produced a first impact value of 297. Thus, use of the harder adhesive (9457) improved the impact resistance of a padding material employing softer beads (3419).

Lines 10 and 11 of Test 1 show similar improved results from use of the harder adhesive (9457) relative to the softer adhesive (9272) in a system wherein the beads had a cylindrical configuration rather than spherical configurations of the beads used in all of the other tests described above. Thus, applicant has concluded that the shape of the beads was not responsible for the improved results obtained through use of harder adhesives such as adhesive 9457.

Test 2 shows the results of another series of tests wherein Acceleration Peak (G) values were determined for various padding material wherein the effects of changes in the volume percentage of a soft adhesive (9272) on the AP(G) values of the material were studied. Test 2 also explores the effects of comparable changes in the volume percentage of a hard adhesive (9457) on AP(G) values of the resulting material. For example, line 1 of Test 2 describes a padding material employing beads designated as 3420 (again, spherical, hard beads made of polypropylene). Line 1 shows that use of 2 volume percent of soft adhesive (9272) adhesive produced a AP(G) value of 110. Impact number 2 on this same material produced an AP(G) value of 254 (see line 2 of Test 2) and impact number 3 produced a 383 value (see line 3 of Test 2).

Line 4 of Test 2 describes a padding material comparable to that described in line 1 except for the fact that the padding material described in line 4 uses 3% of the soft adhesive (9272). This material produced a first impact AP(G) value of 103, a second impact value of 209 and a third impact value of 317. Each of these three AP(G) values represent a modest gain over the comparable values produced by the 2% soft adhesive systems described in lines 1 to 3 of Test 2.

The results of comparable impact tests on a padding material employing 4% of the soft adhesive (9272) generally indicates that the material has lost some of its impact resistance (see lines 7 and 8) relative to the first two impacts on both the 2% and 3% soft adhesive systems. The third impact test on the 4% soft adhesive system (see line 9) shows some improvement (342 v. 383) over the third impact results of the 2% adhesive material. It also shows some loss in impact resistance (342 v. 317) relative to the third impact on the 3% soft adhesive containing padding material. The 5% soft (9272) adhesive containing material described in lines 10 to 12 shows AP(G) values that are, in most cases, modest improvements over the 2%, 3% and 4% adhesive materials.

The Test 2 results beginning at line 14 show the results of impact tests comparable to those just described—except for the fact that the line 14-35 tests employed a hard adhesive (9457) rather than the soft adhesive (9272) previously described with respect to the test described in lines 1-13 of Test 2. For example, lines 14-16 of Test 2 show AP(G) values for the first three impacts upon a hard bead (3420)/2% hard adhesive (9457) system to be 90, 177 and 252. Each of these AP(G) values is lower (and therefore "better") than the comparable values produced by the 2% soft adhesive (9272) system described in lines 1 to 3 of Test 2. Lines 18-20 of Test 2 show that the AP(G) values (i.e., 83, 151 and 220) for the first three impacts on the 3% hard adhesive (9457) are better than those for the 3% soft adhesive (i.e., 103, 209 and 317). Moreover, the fourth, fifth and sixth hits on the 3% hard adhesive material suggest that the added impacts are having less and less destructive effects. The 3% hard adhesive values for the first three hits are also better than the comparable values for the 2% hard adhesive (i.e., 90, 177 and 252). The AP(G) values for first three impacts on the 4% hard adhesive (i.e., 90, 136 and 161) also are better than those for the 4% soft adhesive (i.e., 114, 264 and 342). The 4% hard adhesive (9457) values also are generally better than the 2% and 3% hard adhesive systems. Moreover, the fourth, fifth and sixth impacts produce AP(G) values (i.e., 197, 214, 228) that suggest that the bad effects of repeated blows is reaching a plateau in the 4% hard adhesive system.

The first three AP(G) values for the 5% hard (9457) adhesive (i.e., 92, 134 and 160) of Test 2 are much better than those for the 5% soft adhesive (i.e., 105, 208 and 289). They are, however, only marginally better than the results of the first three impacts on the 4% hard adhesive material. The 5% hard adhesive system does, however, produce better results (i.e., 182, 203 and 209 AP(G) values) with respect to the fourth, fifth and sixth impacts. Thus, it would appear that the impact resistance of these padding materials is reaching a plateau when the adhesive constitutes about 5 value percent of the padding material. As was previously noted, this 5 volume percent for the adhesive in the overall padding material generally corresponds to about 80 weight percent of the padding material owing to the fact that the adhesives are normally much more dense than the beads. Moreover, applicant has generally found that the use of more than about 5 volume percent adhesive (or more than about 80 weight percent adhesive) tends to clog or fill in the void volumes of applicant's padding materials to the point where their desired breathing qualities are greatly impaired. Again, applicant prefers that these padding materials have void volumes of at least 10% of the volume of the material. Again, applicant has found that when more than 5 volume percent (or 80 weight percent) adhesive is used, the void volume usually falls below about 20 volume percent of the material. Hence, for reasons of breathability, as well as diminishing returns with respect to impact resistance, applicant prefers to use no more than 80 weight percent (and preferably less than 60 weight percent) adhesive in the padding materials of this patent disclosure.

TEST 1

| | Bead | Vol. % adhesive | Test Temp | Size (thickness) | Melt Point | Drop Ht. | Accel Peak (G) |
|---|---|---|---|---|---|---|---|
| 1 | 3420 | 2% 9272 | 122 deg. F. | 1" | 275 deg. F. | .86 m | 107 |
| 2 | | | | | | | 272 |
| 3 | | | | | | | 465 |
| 4 | 3420 | 2% 9457 | 122 deg. F. | 1" | 275 deg. F. | .86 m | 95 |
| 5 | | | | | | | 182 |
| 6 | | | | | | | 266 |
| 7 | | | | | | | 379 |
| 8 | 3419 | 2% 9272 | 122 deg. F. | 1" | 275 deg. F. | .86 m | 493 |
| 9 | 3419 | 2% 9457 | 122 deg. F. | 1" | 275 deg. F. | .86 m | 297 |
| 10 | Cylindrical | 2% 9272 | 122 deg. F. | 1" | 329 deg. F. | .86 m | 327 |
| 11 | Cylindrical | 2% 9457 | 122 deg. F. | 1" | 329 deg. F. | .86 m | 146 |
| 12 | | | | | | | 486 |

TEST 2

| | BEAD CODE | BEAD MATERIAL | BEAD DENSITY (pcf) | % adhesive | UT CODE (HELMET #) | SAMPLE THICKNESS | CONDITION | IMPACT LOCATION | ANVIL | DROP HEIGHT (M) | ACCELERATION PEAK (G) |
|---|---|---|---|---|---|---|---|---|---|---|---|
| 1 | 3420 | epp | 3.5 | 2% 9272 | BR0301 | 1" | hot | OT | flat | 0.86 | 110 |
| 2 | 3420 | epp | 3.5 | 2% 9272 | BR0301 | 1" | hot | OT | flat | 0.86 | 254 |
| 3 | 3420 | epp | 3.5 | 2% 9272 | BR0301 | 1" | hot | OT | flat | 0.86 | 383 |
| 4 | 3420 | epp | 3.5 | 3% 9272 | BR0302 | 1" | hot | OT | flat | 0.86 | 103 |
| 5 | 3420 | epp | 3.5 | 3% 9272 | BR0302 | 1" | hot | OT | flat | 0.86 | 209 |
| 6 | 3420 | epp | 3.5 | 3% 9272 | BR0302 | 1" | hot | OT | flat | 0.86 | 317 |
| 7 | 3420 | epp | 3.5 | 4% 9272 | BR0303 | 1" | hot | OT | flat | 0.86 | 114 |
| 8 | 3420 | epp | 3.5 | 4% 9272 | BR0303 | 1" | hot | OT | flat | 0.86 | 264 |
| 9 | 3420 | epp | 3.5 | 4% 9272 | BR0303 | 1" | hot | OT | flat | 0.86 | 342 |
| 10 | 3420 | epp | 3.5 | 5% 9272 | BR0304 | 1" | hot | OT | flat | 0.86 | 105 |
| 11 | 3420 | epp | 3.5 | 5% 9272 | BR0304 | 1" | hot | OT | flat | 0.86 | 208 |
| 12 | 3420 | epp | 3.5 | 5% 9272 | BR0304 | 1" | hot | OT | flat | 0.86 | 289 |
| 13 | 3420 | epp | 3.5 | 5% 9272 | BR0304 | 1" | hot | OT | flat | 0.86 | 379 |
| 14 | 3420 | epp | 3.5 | 2% 9457 | BR0305 | 1" | hot | OT | flat | 0.86 | 90 |
| 15 | 3420 | epp | 3.5 | 2% 9457 | BR0305 | 1" | hot | OT | flat | 0.86 | 177 |
| 16 | 3420 | epp | 3.5 | 2% 9457 | BR0305 | 1" | hot | OT | flat | 0.86 | 252 |
| 17 | 3420 | epp | 3.5 | 2% 9457 | BR0305 | 1" | hot | OT | flat | 0.86 | 357 |
| 18 | 3420 | epp | 3.5 | 3% 9457 | BR0306 | 1" | hot | OT | flat | 0.86 | 83 |
| 19 | 3420 | epp | 3.5 | 3% 9457 | BR0306 | 1" | hot | OT | flat | 0.86 | 151 |
| 20 | 3420 | epp | 3.5 | 3% 9457 | BR0306 | 1" | hot | OT | flat | 0.86 | 220 |
| 21 | 3420 | epp | 3.5 | 3% 9457 | BR0306 | 1" | hot | OT | flat | 0.86 | 229 |
| 22 | 3420 | epp | 3.5 | 3% 9457 | BR0306 | 1" | hot | OT | flat | 0.86 | 277 |
| 23 | 3420 | epp | 3.5 | 3% 9457 | BR0306 | 1" | hot | OT | flat | 0.86 | 278 |
| 24 | 3420 | epp | 3.5 | 4% 9457 | BR0307 | 1" | hot | OT | flat | 0.86 | 90 |
| 25 | 3420 | epp | 3.5 | 4% 9457 | BR0307 | 1" | hot | OT | flat | 0.86 | 136 |
| 26 | 3420 | epp | 3.5 | 4% 9457 | BR0307 | 1" | hot | OT | flat | 0.86 | 161 |
| 27 | 3420 | epp | 3.5 | 4% 9457 | BR0307 | 1" | hot | OT | flat | 0.86 | 197 |

-continued

TEST 2

|    | BEAD CODE | BEAD MATERIAL | BEAD DENSITY (pcf) | % adhesive | UT CODE (HELMET #) | SAMPLE THICKNESS | CONDITION | IMPACT LOCATION | ANVIL | DROP HEIGHT (M) | ACCELERATION PEAK (G) |
|----|-----------|---------------|--------------------|-----------|--------------------|------------------|-----------|-----------------|-------|-----------------|----------------------|
| 28 | 3420 | epp | 3.5 | 4% 9457 | BR0307 | 1" | hot | OT | flat | 0.86 | 214 |
| 29 | 3420 | epp | 3.5 | 4% 9457 | BR0307 | 1" | hot | OT | flat | 0.86 | 228 |
| 30 | 3420 | epp | 3.5 | 5% 9457 | BR0308 | 1" | hot | OT | flat | 0.86 | 92 |
| 31 | 3420 | epp | 3.5 | 5% 9457 | BR0308 | 1" | hot | OT | flat | 0.86 | 134 |
| 32 | 3420 | epp | 3.5 | 5% 9457 | BR0308 | 1" | hot | OT | flat | 0.86 | 160 |
| 33 | 3420 | epp | 3.5 | 5% 9457 | BR0308 | 1" | hot | OT | flat | 0.86 | 182 |
| 34 | 3420 | epp | 3.5 | 5% 9457 | BR0308 | 1" | hot | OT | flat | 0.86 | 203 |
| 35 | 3420 | epp | 3.5 | 5% 9457 | BR0308 | 1" | hot | OT | flat | 0.86 | 209 |

It is counterintuitive that a harder, and presumably more brittle, adhesive material would be a better impact absorbing material than a softer, more elastic adhesive. Nonetheless, this is the case in applicant's bead/adhesive/void space padding materials. Applicant has made many tests such as Tests 1 and 2 and have concluded that some form of micro-fracturing of the adhesive, and perhaps even certain kinds of beads, takes place during impact and that this micro-fracturing can greatly contribute toward the impact absorbing quality of these padding materials.

While applicant's invention has been described with respect to various theories, specific examples, and a spirit that is committed to the concept of coating certain sized beads with a layer of hard adhesive in order to produce padding materials having improved breathability and impact resistance, it is to be understood that this invention is not limited thereto, but rather only should be limited by the scope of the following claims.

What is claimed is:

1. A composite material comprised of a plurality of electrical excitation zone-treated, adhesive coated beads having average diameters between about 1 and about 10 mm and of which at least 50 percent are at least 50 percent coated with an adhesive and wherein a cured form of said adhesive has a hardness ranging from about Shore A 60 to about Shore A 95 and is used in a quantity such that it represents between about 20 and about 80 weight percent of the composite material and thereby serving to create a system of void spaces between the adhesive coated beads that constitutes from about 10 to about 40 volume percent the total volume of said composite material, and wherein the composite material exhibits an acceleration peak (g) value in the range of from about 83 to about 493.

2. The composite material of claim 1 wherein the adhesive coated beads have average diameters between about 1 and about 4 mm.

3. The composite material of claim 1 wherein said beads are inelastic.

4. The composite material of claim 1 wherein said beads are elastic.

5. The composite material of claim 1 wherein said beads are made of polymeric materials selected from the group consisting of polyethylene, propylene and ethyl propylene copolymer.

6. The composite material of claim 1 wherein said system of void spaces is substantially comprised of substantially regularly distributed void spaces.

7. The composite material of claim 1 wherein the beads have diameters ranging from about 1 mm to about 4 mm.

8. The composite material of claim 1 wherein said beads are solid.

9. The composite material of claim 1 wherein said beads are hollow.

10. The composite material of claim 1 wherein said beads are made of a ceramic material.

11. The composite material of claim 1 wherein said beads are made from a glass material.

12. The composite material of claim 1 wherein said beads are made of a plastic material.

13. The composite material of claim 1 wherein the beads have one or more holes passing through their bodies.

14. The composite material of claim 1 wherein said beads are made of a thermosetting material.

15. The composite material of claim 1 wherein said beads are made of a thermoplastic material.

16. The composite material of claim 1 wherein the adhesive is made from a two part resin.

17. The composite material of claim 1 wherein the adhesive is made from a thermosetting synthetic resin.

18. The composite material of claim 1 wherein the adhesive is made from a thermoplastic synthetic material.

19. The composite material of claim 1 wherein said beads are of different sizes.

20. The composite material of claim 1 wherein said beads are comprised of a mixture of different kinds of beads.

21. The composite material of claim 1 wherein said beads are coated with a coupling agent to promote bead/adhesive bonding.

22. The composite material of claim 1 wherein said beads are electrical excitation zone-treated more than once to accomplish more than one kind of treatment.

23. The composite material of claim 1 wherein said beads are coated with a polymeric material by the action of an electrical excitation zone treatment.

24. The composite material of claim 1 wherein said beads are spherical.

25. The composite material of claim 1 wherein said beads are ellipsoid.

26. The composite material of claim 1 wherein said beads are made of different polymeric materials.

27. The composite material of claim 1 wherein said material is placed in a cloth-like casing.

28. The composite material of claim 1 wherein said material is placed in a net-like casing.

29. The composite material of claim 1 wherein said material is used in conjunction with a hard plastic, outer shell.

30. The composite material of claim 1 wherein at least 50 percent of the beads are at least 80 percent covered by the adhesive.

* * * * *

UNITED STATES PATENT AND TRADEMARK OFFICE
CERTIFICATE OF CORRECTION

PATENT NO. : 7,662,468 B2 Page 1 of 1
APPLICATION NO. : 10/685965
DATED : February 16, 2010
INVENTOR(S) : David W. Bainbridge It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 0 days.

Signed and Sealed this

Thirtieth Day of November, 2010

David J. Kappos
*Director of the United States Patent and Trademark Office*